(12) United States Patent
Tremmel et al.

(10) Patent No.: US 11,262,873 B2
(45) Date of Patent: Mar. 1, 2022

(54) CONDUCTIVE FIBERS WITH CUSTOM PLACEMENT CONFORMAL TO EMBROIDERED PATTERNS

(71) Applicant: Google LLC, Mountain View, CA (US)

(72) Inventors: Shiho Tremmel, Kanagawa (JP); Ivan Poupyrev, Sunnyvale, CA (US); Munehiko Sato, Tokyo (JP)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/509,888

(22) Filed: Jul. 12, 2019

(65) Prior Publication Data

US 2020/0125195 A1    Apr. 23, 2020

(30) Foreign Application Priority Data

Oct. 22, 2018  (WO) ................ PCT/US2018/056859

(51) Int. Cl.
*G06F 3/044* (2006.01)
*D05C 17/00* (2006.01)
(Continued)

(52) U.S. Cl.
CPC .......... *G06F 3/044* (2013.01); *D03D 1/0088* (2013.01); *D05C 17/00* (2013.01); *G06F 3/0446* (2019.05); *A41D 1/005* (2013.01); *D05D 2303/40* (2013.01); *G06F 2203/04102* (2013.01); *G06F 2203/04103* (2013.01)

(58) Field of Classification Search
CPC .......... G06F 1/163; G06F 2203/04102; G06F 3/044; G06F 3/0446; G06F 3/0443; G06F 3/04164; G06F 2203/04103; G06F 2203/04105; D05D 2303/40; D03D 1/0088; D03D 13/004; D03D 15/00; D03D 15/44;
(Continued)

(56) References Cited

U.S. PATENT DOCUMENTS 6,493,933 B1 * 12/2002 Post ................... H01L 23/4985
                                                      257/E23.065
7,467,418 B2 * 12/2008 Kronenberger ........ A42B 1/248
                                                           2/1
(Continued)

FOREIGN PATENT DOCUMENTS

WO   WO 2004/107831   12/2004
WO   WO 2006/129272   12/2006
WO   WO 2017/095861    6/2017

OTHER PUBLICATIONS

International Search Report and Written Opinion for PCT/US2018/056859 dated May 23, 2019, 13 pages.

*Primary Examiner* — Dismery Mercedes
(74) *Attorney, Agent, or Firm* — Dority & Manning, P.A.

(57) ABSTRACT

Systems and methods for interactive textiles including conductive fibers are provided. An interactive textile may comprise a flexible substrate, an embroidered thread-pattern defining an ornamental feature on a first surface of the flexible substrate, and a touch input sensor comprising a set of conductive threads coupled to a second surface of the flexible substrate at a corresponding area of at least a portion of the embroidered thread pattern. The set of conductive threads form a conductive thread-pattern on the second surface that is conformal to the ornamental feature on the first surface at the portion of the embroidered thread pattern.

20 Claims, 17 Drawing Sheets

(51) Int. Cl.
*D03D 1/00* (2006.01)
*A41D 1/00* (2018.01)

(58) Field of Classification Search
CPC .......... A61B 5/6804; A61B 2562/0247; A61B 2562/164; A41D 1/005; A41D 1/002
See application file for complete search history.

(56) References Cited

U.S. PATENT DOCUMENTS

| | | | |
|---|---|---|---|
| 8,006,633 B2* | 8/2011 | Bennett | A61N 1/0484 112/475.22 |
| 8,161,826 B1* | 4/2012 | Taylor | G01L 1/18 73/862.044 |
| 8,368,505 B2* | 2/2013 | Deppiesse | H03K 17/965 338/114 |
| 8,701,578 B2* | 4/2014 | Chung | A41D 1/005 112/439 |
| 9,148,949 B2* | 9/2015 | Zhou | H05K 1/0283 |
| 9,863,823 B2* | 1/2018 | McMillen | G01L 1/06 |
| 9,983,747 B2* | 5/2018 | Poupyrev | G06F 3/0445 |
| 10,338,755 B2* | 7/2019 | Podhajny | G06F 3/0446 |
| 10,508,367 B2* | 12/2019 | Grant | G01K 13/00 |
| 2010/0317954 A1* | 12/2010 | Jeong | A61B 5/296 600/372 |
| 2016/0048236 A1* | 2/2016 | Poupyrev | G06F 1/163 345/174 |
| 2016/0132153 A1* | 5/2016 | Lin | G06F 3/0446 345/174 |
| 2016/0284436 A1* | 9/2016 | Fukuhara | H01B 7/04 |
| 2016/0328043 A1* | 11/2016 | Moller | G06F 3/0446 |
| 2017/0056644 A1* | 3/2017 | Chahine | A61N 1/36003 |
| 2017/0305301 A1* | 10/2017 | McMillen | G01L 1/2287 |
| 2019/0376214 A1* | 12/2019 | Chathuranga Perera | D02G 3/12 |

* cited by examiner

CONDUCTIVE FIBERS WITH CUSTOM PLACEMENT CONFORMAL TO EMBROIDERED PATTERNS

PRIORITY CLAIM

The present application is based upon and claims the right of priority to International Application No. PCT/US2018/056859, filed on Oct. 22, 2018, the disclosure of which is hereby incorporated by reference herein in its entirety for all purposes.

FIELD

The present disclosure relates generally to interactive textiles that include conductive fibers.

BACKGROUND

An interactive textile includes conductive fibers such as conductive threads incorporated into the interactive textile to form a sensor such as a capacitive touch sensor that is configured to detect touch-input. The interactive textile can process the touch-input to generate touch data that is useable to initiate functionality at various remote devices that are wirelessly coupled to the interactive textile. Interactive textiles may include conductive fibers for other purposes, such as for strain sensors using conductive threads and for visual interfaces using fiber optics.

Traditionally, interactive textiles have been constructed by forming a grid or array of conductive thread woven into the interactive textile. Each conductive thread includes a conductive wire (e.g., a copper wire) that is twisted, braided, or wrapped with one or more flexible threads (e.g., polyester or cotton threads). It may be difficult, however, for manufacturers to efficiently and cost-effectively manufacture interactive textiles using these techniques.

SUMMARY

Aspects and advantages of embodiments of the present disclosure will be set forth in part in the following description, or may be learned from the description, or may be learned through practice of the embodiments.

One example aspect of the present disclosure is directed to an interactive textile. The interactive textile comprises a flexible substrate, an embroidered thread-pattern defining an ornamental feature on a first surface of the flexible substrate, and a touch input sensor comprising a set of conductive threads coupled to a second surface of the flexible substrate at a corresponding area of at least a portion of the embroidered thread pattern. The set of conductive threads form a conductive thread-pattern on the second surface that is conformal to the ornamental feature on the first surface at the portion of the embroidered thread pattern.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for communicating with a touch sensor comprising a set of conductive threads conformal to an embroidered thread pattern.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
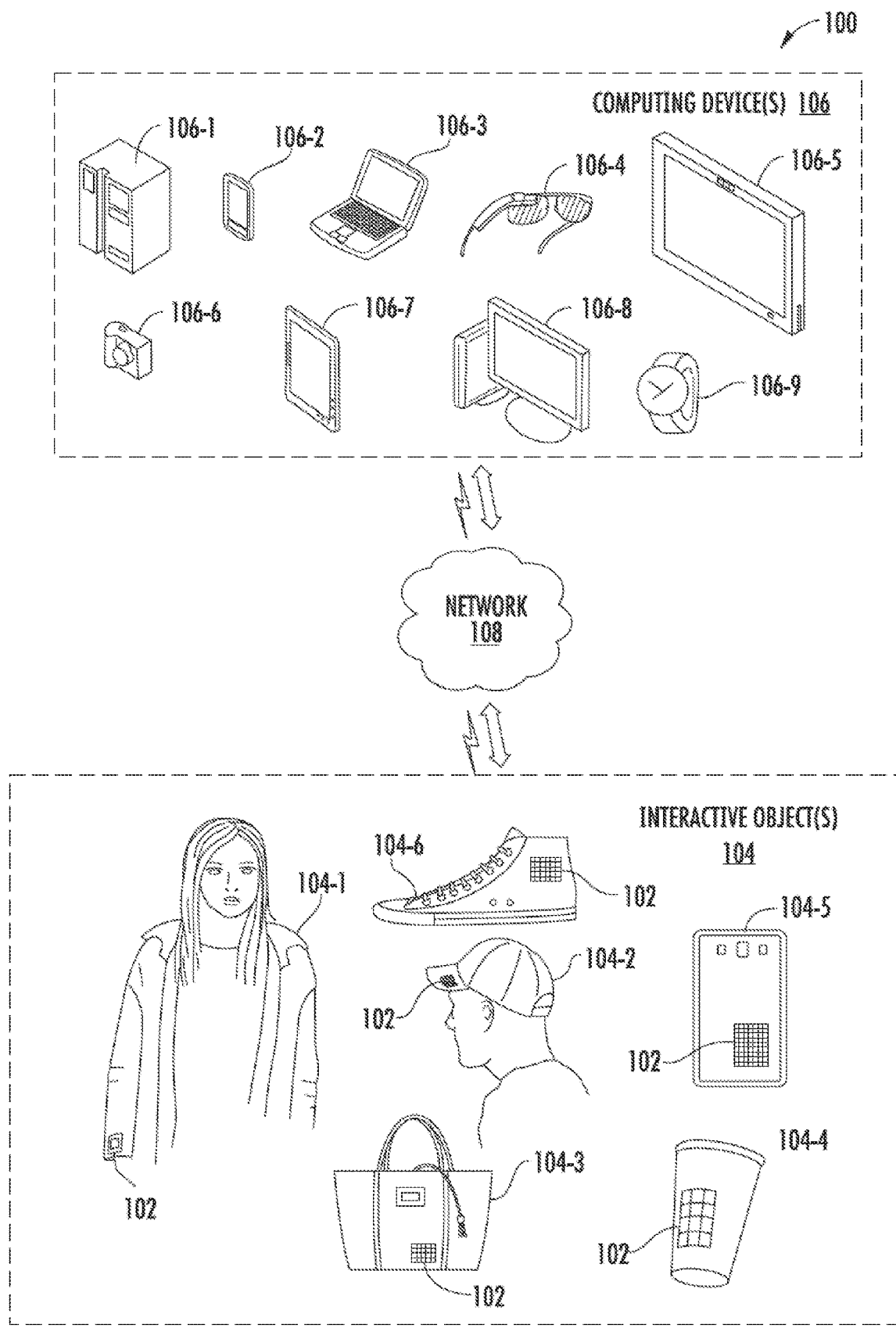
FIG. 1 depicts a block diagram of an example computing environment in which an interactive textile including a sensor conformal to an embroidered thread pattern can be implemented.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to an interactive textile that includes conductive fibers attached to a flexible substrate with a custom placement that is conformal to an ornamental feature defined by an embroidered thread pattern. The conductive fibers can include conductive threads, fiber optics, and other conductive materials. For example, conductive fibers such as conductive threads can be used to form a capacitive touch sensor that is configured to detect touch-input at an area of the flexible substrate that includes the embroidered thread pattern. The conformal placement of conductive threads relative to the embroidered thread pattern provides a user interface for receiving touch input for the interactive textile in a manner that is intuitive for users of the interactive textile. By way of example, the interactive textile can process a touch-input to generate touch data that is usable to initiate functionality at various remote devices that can be wirelessly coupled to the interactive object. For instance, the interactive textile may provide a user interface for adjusting the volume of a speaker, controlling playback of a movie on a mobile device, answering a call, etc. Conductive threads can also be used to form strain-gauge sensors and other types of sensors. Conductive fibers can also be used as light sources, such as in fiber optics. Due to the flexibility of textiles, the interactive textile can easily be integrated within both flexible objects to form flexible interactive objects or hard objects to form hard interactive objects.

The conductive thread of an interactive textile may include a conductive core that includes at least one conductive wire and a cover layer constructed from flexible threads that covers the conductive core. The conductive core may be formed by twisting one or more flexible threads (e.g., silk threads, polyester threads, or cotton threads) with the conductive wire, or by wrapping flexible threads around the conductive wire. In some implementations, the conductive core may be formed by braiding the conductive wire with flexible threads (e.g., silk). The cover layer may be formed by wrapping or braiding flexible threads around the conductive core. In some implementations, the conductive thread is implemented with a "double-braided" structure in which the conductive core is formed by braiding flexible threads with a conductive wire, and then braiding flexible threads around the braided conductive core. Other types of conductive fibers may be used in accordance with embodiments of the disclosed technology. For example, a conductive fiber can be used to transmit and/or emit light, such as in fiber optic applications. Although many examples are provided with respect to conductive threads, it will be appreciated that any type of conductive fiber can be used with an embroidered thread pattern according to example embodiments.

According to example embodiments, an embroidered thread pattern may be provided on a flexible substrate. The flexible substrate may include a textile such as a woven or non-woven fabric, or other materials such as flexible plastics, films, etc. The embroidered thread pattern can define an ornamental feature on a front surface of the flexible substrate. The ornamental feature can have one or more edges, which can be curved, straight, or have any suitable pattern or design. In some examples, an edge of the ornamental feature can be an embroidered edge. In other examples, an edge of the ornamental feature can be defined by the end of a plurality of embroidered threads. A set of conductive fibers such as conductive threads can be attached to the flexible substrate at an area of a second surface of the flexible substrate corresponding to at least a portion of the embroidered thread pattern. The set of conductive threads can define a conductive thread pattern that is conformal to the ornamental feature at the area of the portion of the embroidered thread pattern. The conductive thread pattern can be formed on the back surface of the flexible substrate, conformal to at least a portion of the embroidered thread pattern on the front surface. In this manner, the set of conductive threads can form a capacitive touch sensor that is conformal to an ornamental feature defined by an embroidered thread pattern.

By way of example, one or more conductive fibers of a conductive thread pattern may be conformal to at least one edge of the embroidered thread pattern. A conductive fiber that is conformal to an edge of an embroidered thread pattern may be aligned (e.g., in a longitudinal and/or lateral direction defined by the substrate) with the edge, or may define a line that is offset from the edge with a spacing. A plurality of conductive fibers may be formed conformal to an edge of an embroidered thread pattern by forming each fiber with a different offset from the edge. By way of example, an embroidered thread pattern may define a curved edge. One or more conductive fibers may be conformal to the curved edge by forming the thread(s) in alignment with the curved edge or at an offset having a consistent spacing from the curved edge. In another example, a plurality of conductive fibers may be formed conformal to an edge by forming each thread with an embroidered portion having an end that terminates at the edge.

In example embodiments, conductive fibers such as the conductive threads or fiber optics of an interactive textile can be selectively affixed to the flexible substrate at desired locations using an embroidery process to form a conductive thread pattern. For example, one or more conductive threads can be attached to the flexible substrate using an embroidery process that attaches the conductive threads to the flexible substrate at a selected location using one or more embroidery threads. The conductive threads can be embroidered to the flexible substrate at a location corresponding to an embroidered thread pattern. The embroidery process for the conductive threads can be omitted at areas outside of the embroidered area so that that a touch sensor, strain sensor, etc. conforms to the embroidered thread pattern. In other examples, the conductive threads may be attached to the flexible substrate using other techniques. For example, the conductive threads may be sewn or stitched to the flexible substrate using techniques other than embroidery. In other examples, the conductive threads may be attached to the flexible substrate using glue, tape, or other bonding techniques. In some examples, the conductive threads may be attached to the flexible substrate using embroidery threads that are used to form the embroidered thread pattern.

The conductive fibers, such as conductive threads of a capacitive touch or other sensor can be formed on various surfaces relative to the flexible substrate and/or the embroidered thread pattern. In some examples, an embroidered thread pattern can be formed on a front (or visible) surface of a flexible substrate, and a set of conductive threads can be attached at a back (or non-visible) surface of the flexible substrate opposite the front surface. The conductive threads form a conductive thread pattern on the back surface. The conductive threads can be attached to the back surface of the flexible substrate using one or more threads of the embroidered thread pattern and/or using one or more additional threads. In some examples, the conductive threads can be adjacent to the back surface of the flexible substrate, positioned between the back surface and a non-visible portion of the embroidered thread pattern that extends from the back surface of the flexible substrate. In other examples, a non-visible portion of the embroidered thread pattern can be formed adjacent to the back surface of the flexible substrate and the conductive threads can be attached over the portion of the non-visible portion. In yet another example, at least a portion of one or more of the conductive threads may extend outward from the front surface of the flexible substrate. The conductive thread(s) may be exposed at one or more locations of the embroidered thread pattern on the front surface of the flexible substrate.

The conductive fibers can be embroidered to the flexible substrate before, after, or simultaneously with the embroidered thread pattern. In some examples, a first embroidery process can be performed to form an embroidered thread pattern. The embroidered thread pattern can define an ornamental feature on a front surface of the flexible substrate. After the first embroidery process, a plurality of conductive threads can be attached to the flexible substrate to form a capacitive touch sensor in a second embroidery process. The conductive threads can be attached to a back surface of the flexible substrate that is opposite to the front surface. In other examples, the plurality of conductive threads can be embroidered to the flexible substrate to form a capacitive touch sensor in a first embroidery process. After embroidering the conductive threads to the back surface of the flexible substrate, a second embroidery process can be performed to form an embroidered thread pattern on the front surface of the flexible substrate. On the back surface of the flexible substrate opposite the ornamental feature, the embroidery threads can be formed over the conductive threads to further integrate the conductive threads with the flexible substrate. In yet another example, the plurality of conductive threads and the embroidered thread pattern can be embroidered to the flexible substrate simultaneously in a common embroidery process.

Multiple sets of conductive fibers can be attached to a flexible substrate that are conformal to an embroidered thread pattern in example embodiments. In one example, a second plurality of conductive threads can be formed that cross a first plurality of threads to form a grid or array of conductive threads. The grid or array of conductive threads may be referred to as a capacitive touch grid. For example, the first plurality of conductive threads can be oriented substantially in a lateral direction and the second plurality of conductive threads can be oriented substantially in a longitudinal direction to form a grid. The lateral and longitudinal directions are orthogonal in some embodiments. In other examples, the first plurality of conductive threads and the second plurality of conductive threads can cross at a non-orthogonal angle. The dimensions of individual conductive threads can be varied to form various conductive thread patterns that are conformal to an embroidered thread pattern.

Touch inputs provided via a capacitive touch sensor as described may include various applications and capabilities. By way of example, a touch sensor may be used as a button to detect a simple touch input at a location of the touch sensor. In some examples, a one-dimensional array of conductive threads may be used to implement a touch sensor that can detect a button-type input. A one-dimensional array of conductive threads may also be used to detect a one-dimensional swipe input (e.g., movement in a single direction corresponding to the spacing between threads). In some examples, a two-dimensional array of conductive threads may be used to implement a touch sensor that can detect trackpad inputs, including a specific location of a touch within a grid of conductive threads. Additionally, a two-dimensional array of conductive threads may be used to detect various gesture inputs, authentication inputs, predefined keystrokes, movements, user-specific natural behaviors and the like. One or more machine-learned models may be used to detect user inputs based on training the machine-learned models using training data. Additionally, the touch sensor may be configured to detect analog and pseudo-force inputs from a capacitive change caused by a finger distance.

According to some aspects, an external computing device (e.g., smartphone, tablet, laptop, etc.) can be communicatively coupled to an interactive textile using one or more wireless and/or wired interfaces. A gesture manager can be implemented on the computing device to store mappings between gestures and functionalities of the computing device. A functionality mapped to a gesture can be initiated in response to detecting the gesture at the interactive textile. In some examples, an interactive textile can be configured to selectively respond to gestures based on the location of the gesture relative to the capacitive touch sensor.

A first set of conductive threads can be formed at a first area of the flexible substrate corresponding to a first portion of an embroidered thread pattern. The first set of conductive threads can be conformal to the first portion of the embroidered thread pattern. A second set of conductive threads can be formed at a second portion of the flexible substrate corresponding to a second portion of the embroidered thread pattern. The second set of conductive threads can be conformal to the second portion of the embroidered thread pattern. In some instances, an interactive textile can be configured to be responsive to a first gesture provided in association with the first set of conductive threads at the first portion of the embroidered thread pattern. The interactive textile can be configured to be responsive to a second gesture provided in association with the second set of conductive threads of the second portion of the embroidered thread pattern. For instance, the first set of conductive threads may be formed in a lateral direction with a spacing therebetween in a longitudinal direction. The first set of conductive threads may be responsive to an input gesture comprising a touch motion in the longitudinal direction provided at a first portion of the embroidered thread pattern. For example, the input gesture may comprise a swipe or sliding motion in the longitudinal direction. The textile controller may sense a touch input sequentially at the plurality of conductive threads spaced in the longitudinal direction. The second set of conductive threads may be formed in the longitudinal direction with a spacing therebetween in the lateral direction. The second set of conductive threads may be responsive to an input gesture comprising touch motion in the lateral direction provided at a second portion of the embroidered thread pattern. For example, the input gesture may comprise a swipe or sliding motion in the lateral direction. The textile controller may sense a touch input sequentially at the plurality of conductive threads spaced in the lateral direction. In some examples, the interactive textile can be configured to be nonresponsive to the first gesture at the second portion of the embroidered thread pattern and to be nonresponsive to the second gesture of the first portion of the embroidered thread pattern. For example, the first set of threads may be non-responsive to a first gesture that includes touch input in the lateral direction. The second set of threads may be non-responsive to a second gesture that includes touch input in the longitudinal direction. In this manner, the interactive textile can be configured to easily discriminate between multiple gestures provided in association with a single embroidered thread pattern. Moreover, the gestures may be intuitively linked to portions of the embroidered thread pattern based on the conformal formation of conductive threads in association with the individual portions of the embroidered thread pattern.

In some examples, a pitch associated with a plurality of conductive threads can be varied to adjust the sensitivity of a capacitive touch sensor at different locations of embroidered thread pattern. The pitch of a group of conductive threads can refer to the spacing between individual threads of the group. The pitch of a set of conductive threads can be varied such that the pitch associated with a first group of the set of conductive threads is less than the pitch of a second group of the set conductive threads. In this manner, a first portion of an embroidered thread pattern corresponding to the first group of conductive threads can be more sensitive than a second portion of the embroidered thread pattern corresponding to the second group of conductive threads. In other examples, the pitch between individual threads can be varied along the length of the threads to define different sensitivities for the touch sensor. In some examples, the decreased pitch may be provided in association with a particular portion of an embroidered thread pattern that may be intuitively linked to user input.

Embodiments of the disclosed technology provide a number of technical effects and benefits, particularly in the areas of computing technology, textiles, and the integration of the two. Conductive fibers are formed that are conformal to an embroidered thread pattern formed on a flexible substrate. By forming conductive fibers such as conductive threads that are conformal to the embroidered thread pattern, a capacitive touch sensor or other sensor can be formed in an area of the flexible substrate corresponding to the embroidered thread pattern. The embroidered thread pattern may provide a natural indication of a location for touch input. Moreover, the embroidered thread pattern may provide a natural indication of a type of touch input to provide. For instance, a curved embroidered edge may provide an indication to trace the edge to provide an input. In this manner, an intuitive capacitive touch interface can be provided on interactive objects.

Aspects of the disclosed technology additionally provide improved integration of conductive threads into flexible substrates. For example, conductive fibers may be embroidered to an existing flexible substrate. Through an embroidery process, numerous shapes, edges, designs, etc. can be formed. Moreover, the conductive fibers can be formed with a custom placement conformal an embroidered thread pattern. Such a technique can be contrasted with traditional weaving or other fabric manufacturing processes that require integration of the conductive threads into the textile manufacturing process. Such techniques can be expensive and may not be suitable to frequent or last minute design changes. With an embroidery process as described, the conductive fibers can be placed in a custom location with reduced complexity and costs associated with design changes. By way of example, a name or logo may be embroidered on a garment and a custom placement of embroidered conductive fibers provided in relation to the name or logo embroidered on the garment. This process can be repeated for multiple names or logos without requiring a new textile fabric. Rather, the same fabric can be used to construct multiple garments. Custom embroidered designs and corresponding conformal conductive fibers can be applied to the garments in a cost-effective and efficient manner.

Additional aspects of the disclosed technology can provide an improved user interface for computing devices. For example, a capacitive touch sensor can provide an easy to use and intuitive interface for providing gesture inputs to the computing device. An embroidered thread pattern can provide a visual indication of the location of a capacitive touch interface on an interactive object. Additionally and/or alternatively, the embroidered thread pattern can provide a visual indication of a type of gesture to provide. In such a manner, a user can easily understand an appropriate action to take to initiate functionality at the computing device.

According to some embodiments, a capacitive touch sensor formed from one or more sets of conductive threads can be coupled to an internal electronics module that is integrated into an interactive object. The set(s) of conductive threads can be directly attached to the internal electronics module or can be attached to the internal electronics module via one or more connector components. A removable electronics module that includes a second subset of electronic components (e.g., a microprocessor, power source, or network interface) is removably coupled to the interactive object via a communication interface. The communication interface enables communication between the internal electronics module and the removable electronics module when the removable electronics module is coupled to the interactive object.

The internal electronics module can include a first subset of electronic components, such as sensing circuitry configured to detect touch-input to the conductive threads. The sensing circuitry in some examples comprises a controller that is configured to detect a touch-input when user pressure is applied to the conductive threads. The controller can be configured to communicate the touch-input data to a computing device. In some examples, the controller comprises a flexible printed circuit board (PCB). The printed circuit board can include a set of contact pads for attaching to the conductive threads. In some examples, the printed circuit board includes a microprocessor. A portion of the PCB (e.g., including the microprocessor) can be overmolded with a polymer composition.

In example embodiments, the removable electronics module can be removably mounted to a rigid member on the interactive object. A connector can include a connecting device at a first end for electrically coupling to the removable electronics module. The internal electronics module can be in communication with the connector. The internal electronics module can be configured to communicate with the removable electronics module when connected to the connector. A controller of the removable electronics module can receive information and send commands to the internal electronics module. A communication interface is configured to enable communication between the internal electronics module and the controller when the connector is coupled to the removable electronics module. For example, the communication interface may comprise a network interface integral with the removable electronics module. The removable electronics module can also include a rechargeable power source. The removable electronics module can be removable from the interactive object for charging the power source. Once the power source is charged, the removable electronics module can then be placed back into the interactive object and electrically coupled to the connector.

FIG. 1 is an illustration of an example environment 100 in which an interactive textile including conductive fibers conformal to an embroidered thread pattern can be implemented. Environment 100 includes an interactive textile 102, which is shown as being integrated within various interactive objects 104. Interactive textile 102 is a textile that is configured to sense touch-input (e.g., multi-touch input). As described herein, a textile may include any type of flexible woven material consisting of a network of natural or artificial fibers, often referred to as thread or yarn. Textiles may be formed by weaving, knitting, crocheting, knotting, pressing threads together or consolidating fibers or filaments together in a nonwoven manner.

In environment 100, interactive objects 104 include "flexible" objects, such as a shirt 104-1, a hat 104-2, a handbag 104-3 and a shoe 104-6. It is to be noted, however, that interactive textile 102 may be integrated within any type of flexible object made from fabric or a similar flexible material, such as garments or articles of clothing, garment accessories, garment containers, blankets, shower curtains, towels, sheets, bed spreads, or fabric casings of furniture, to name just a few. Examples of garment accessories may include sweat-wicking elastic bands to be worn around the head, wrist, or bicep. Other examples of garment accessories may be found in various wrist, arm, shoulder, knee, leg, and hip braces or compression sleeves. Headwear is another example of a garment accessory, e.g. sun visors, caps, and thermal balaclavas. Examples of garment containers may include waist or hip pouches, backpacks, handbags, satchels, hanging garment bags, and totes. Garment containers may be worn or carried by a user, as in the case of a backpack, or may hold their own weight, as in rolling luggage. Interactive textile 102 may be integrated within flexible objects 104 in a variety of different ways, including weaving, sewing, gluing, and so forth.

In this example, objects 104 further include "hard" objects, such as a plastic cup 104-4 and a hard smart phone casing 104-5. It is to be noted, however, that hard objects 104 may include any type of "hard" or "rigid" object made from non-flexible or semi-flexible materials, such as plastic, metal, aluminum, and so on. For example, hard objects 104 may also include plastic chairs, water bottles, plastic balls, or car parts, to name just a few. In another example, hard objects 104 may also include garment accessories such as chest plates, helmets, goggles, shin guards, and elbow guards. Alternatively, the hard or semi-flexible garment accessory may be embodied by a shoe, cleat, boot, or sandal. Interactive textile 102 may be integrated within hard objects 104 using a variety of different manufacturing processes. In one or more implementations, injection molding is used to integrate interactive textiles 102 into hard objects 104.

Interactive textile 102 enables a user to control object 104 that the interactive textile 102 is integrated with, or to control a variety of other computing devices 106 via a network 108. Computing devices 106 are illustrated with various non-limiting example devices: server 106-1, smart phone 106-2, laptop 106-3, computing spectacles 106-4, television 106-5, camera 106-6, tablet 106-7, desktop 106-8, and smart watch 106-9, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers).

Network 108 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Interactive textile 102 can interact with computing devices 106 by transmitting touch data or other sensor data through network 108. Computing device 106 uses the touch data to control computing device 106 or applications at computing device 106. As an example, consider that interactive textile 102 integrated at shirt 104-1 may be configured to control the user's smart phone 106-2 in the user's pocket, television 106-5 in the user's home, smart watch 106-9 on the user's wrist, or various other appliances in the user's house, such as thermostats, lights, music, and so forth. For example, the user may be able to swipe up or down on interactive textile 102 integrated within the user's shirt 104-1 to cause the volume on television 106-5 to go up or down, to cause the temperature controlled by a thermostat in the user's house to increase or decrease, or to turn on and off lights in the user's house. Note that any type of touch, tap, swipe, hold, or stroke gesture may be recognized by interactive textile 102.

Figure 2:
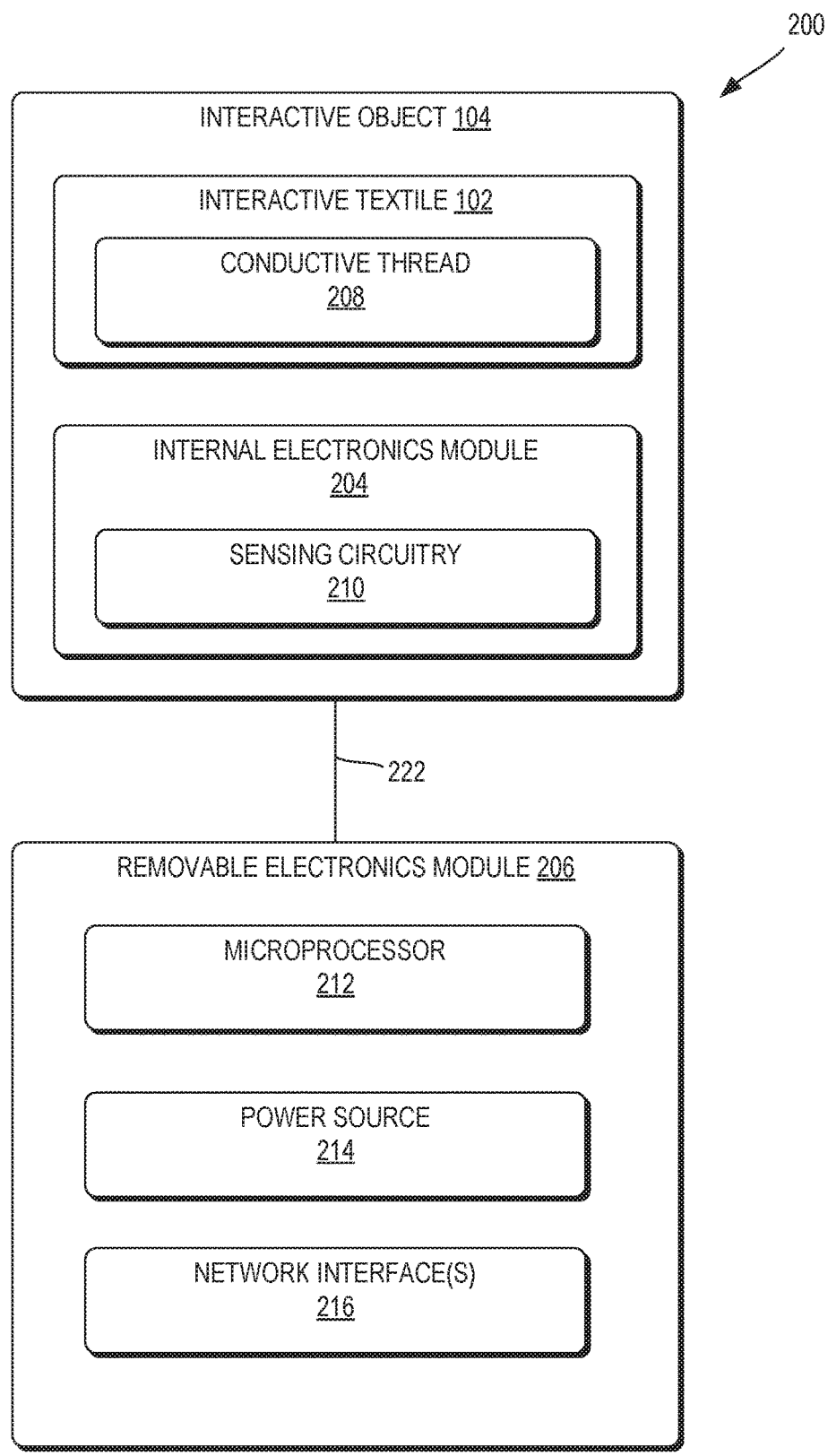
FIG. 2 depicts a block diagram of an example system that includes an interactive textile and a removable electronics module in accordance with example embodiments of the present disclosure.

In more detail, consider FIG. 2 which illustrates an example system 200 that includes an interactive object and multiple electronics modules. In system 200, interactive textile 102 is integrated in an object 104, which may be implemented as a flexible object (e.g., shirt 104-1, hat 104-2, or handbag 104-3) or a hard object (e.g., plastic cup 104-4 or smart phone casing 104-5).

Interactive textile 102 is configured to sense touch-input from a user when one or more fingers of the user's hand touch interactive textile 102. Interactive textile 102 may be configured to sense single-touch, multi-touch, and/or full-hand touch-input from a user. To enable the detection of touch-input, interactive textile 102 includes conductive threads 202, which as described hereinafter, can be coupled to interactive textile 102 (e.g., in a grid, array or parallel pattern) so as to be conformal to an embroidered thread pattern. Notably, the conductive threads 202 do not alter the flexibility of interactive textile 102 in example embodiments, which enables interactive textile 102 to be easily integrated within interactive objects 104.

Interactive object 104 includes an internal electronics module 204 that is embedded within interactive object 104 and is directly coupled to conductive threads 202. Internal electronics module 204 can be communicatively coupled to a removable electronics module 206 via a communication interface 222. Internal electronics module 204 contains a first subset of electronic components for the interactive object 104, and removable electronics module 206 contains a second, different, subset of electronics components for the interactive object 104. As described herein, the internal electronics module 204 may be physically and permanently embedded within interactive object 104, whereas the removable electronics module 206 may be removably coupled to interactive object 104.

In system 200, the electronic components contained within the internal electronics module 204 includes sensing circuitry 210 that is coupled to conductive thread 208 that is woven into interactive textile 102. For example, wires from the conductive threads 208 may be connected to sensing circuitry 210 using flexible PCB, creping, gluing with conductive glue, soldering, and so forth. In one embodiment, the sensing circuitry 210 can be configured to detect a user-inputted touch-input on the conductive threads that is pre-programmed to indicate a certain request. In one embodiment, when the conductive threads form a grid or other pattern, sensing circuitry 210 can be configured to also detect the location of the touch-input on conductive thread 208, as well as motion of the touch-input. For example, when an object, such as a user's finger, touches conductive thread 208, the position of the touch can be determined by sensing circuitry 210 by detecting a change in capacitance on the grid or array of conductive thread 208. The touch-input may then be used to generate touch data usable to control a computing device 106. For example, the touch-input can be used to determine various gestures, such as single-finger touches (e.g., touches, taps, and holds), multi-finger touches (e.g., two-finger touches, two-finger taps, two-finger holds, and pinches), single-finger and multi-finger swipes (e.g., swipe up, swipe down, swipe left, swipe right), and full-hand interactions (e.g., touching the textile with a user's entire hand, covering textile with the user's entire hand, pressing the textile with the user's entire hand, palm touches, and rolling, twisting, or rotating the user's hand while touching the textile).

Communication interface 222 enables the transfer of power and data (e.g., the touch-input detected by sensing circuitry 210) between the internal electronics module 204 and the removable electronics module 206. In some implementations, communication interface 222 may be implemented as a connector that includes a connector plug and a connector receptacle. The connector plug may be implemented at the removable electronics module 206 and is configured to connect to the connector receptacle, which may be implemented at the interactive object 104.

In system 200, the removable electronics module 206 includes a microprocessor 212, power source 214, and network interface 216. Power source 214 may be coupled, via communication interface 222, to sensing circuitry 210 to provide power to sensing circuitry 210 to enable the detection of touch-input, and may be implemented as a small battery. In one or more implementations, communication interface 222 is implemented as a connector that is configured to connect removable electronics module 206 to internal electronics module 204 of interactive object 104. When touch-input is detected by sensing circuitry 210 of the internal electronics module 204, data representative of the touch-input may be communicated, via communication interface 222, to microprocessor 212 of the removable electronics module 206. Microprocessor 212 may then analyze the touch-input data to generate one or more control signals, which may then be communicated to computing device 106 (e.g., a smart phone) via the network interface 216 to cause the computing device 106 to initiate a particular functionality. Generally, network interfaces 216 are configured to communicate data, such as touch data, over wired, wireless, or optical networks to computing devices 106. By way of example and not limitation, network interfaces 216 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like (e.g., through network 108 of FIG. 1).

While internal electronics module 204 and removable electronics module 206 are illustrated and described as including specific electronic components, it is to be appreciated that these modules may be configured in a variety of different ways. For example, in some cases, electronic components described as being contained within internal electronics module 204 may be at least partially implemented at the removable electronics module 206, and vice versa. Furthermore, internal electronics module 204 and removable electronics module 206 may include electronic components other that those illustrated in FIG. 2, such as sensors, light sources (e.g., LED's), displays, speakers, and so forth.

Figure 3:
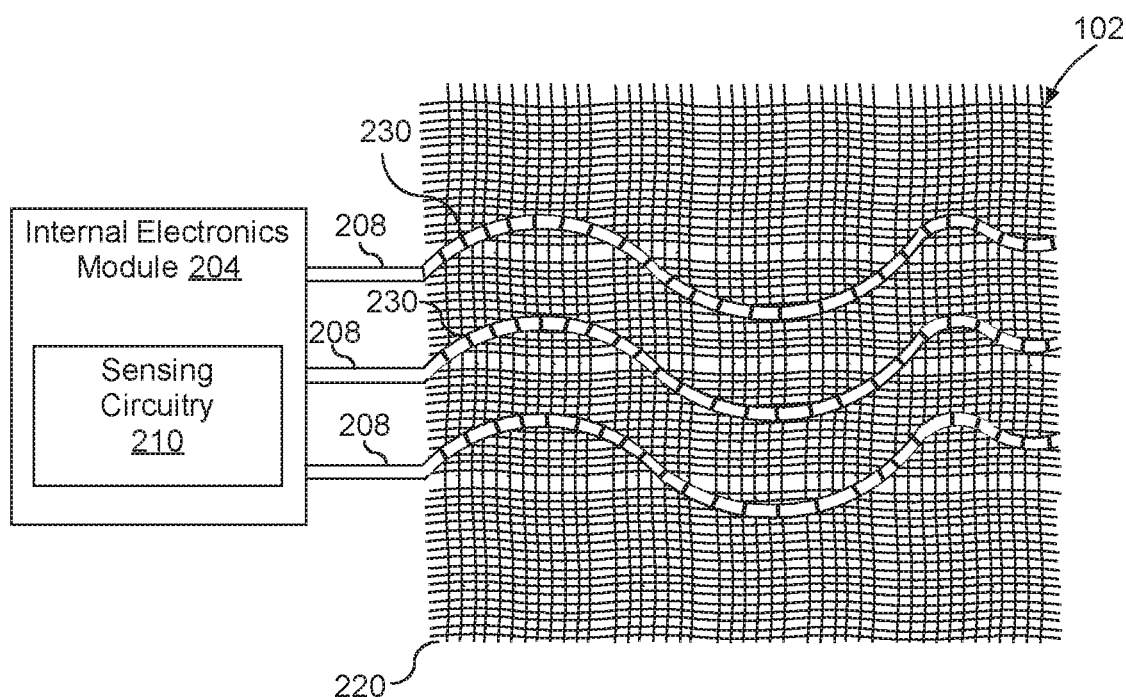
FIG. 3 depicts an example of an interactive textile including embroidered conducive fibers in accordance with example embodiments of the present disclosure.

FIG. 3 illustrates an example 300 of interactive object 104 including a capacitive touch sensor formed with conductive threads in accordance with one or more implementations. In this example, interactive textile 102 of the interactive object 104 includes non-conductive threads 220 forming a flexible substrate of interactive textile 102. Non-conductive threads 220 may correspond to any type of non-conductive thread, fiber, or fabric, such as cotton, wool, silk, nylon, polyester, and so forth. Although FIG. 3 provides an example with respect to conductive threads, it will be appreciated that other conductive fibers such as fiber optics and the like may be formed in a similar manner.

Conductive threads 208 include a conductive wire or a plurality of conductive filaments that are twisted, braided, or wrapped with a flexible thread. As shown, the conductive thread 208 can be embroidered onto the flexible substrate using embroidery thread(s) 230 and integrated with the non-conductive threads 220 to form a fabric or a textile. In other examples, conductive threads 208 can be affixed to the non-conductive threads 230 using glue, tape, or thread using other sewing techniques.

In one or more implementations, conductive thread 208 includes a thin copper wire. It is to be noted, however, that the conductive thread 208 may also be implemented using other materials, such as silver, gold, or other materials coated with a conductive polymer. The conductive thread 208 may include an outer cover layer formed by braiding together non-conductive threads. The non-conductive threads may be implemented as any type of flexible thread or fiber, such as cotton, wool, silk, nylon, polyester, and so forth.

Interactive textile 102 can be formed in a cost-effective manner and efficiently, using any conventional embroidery process (e.g., free-motion embroidery, link stitch embroidery, chenile embroidery), which involves stitching a set of main threads to a fabric using a set of embroidery threads. Embroidery may be implemented on a frame or machine, of which there are a number of types. Thus, a machine can embroider conductive threads 208 onto non-conductive threads 220 using embroidery thread(s) 230 to create interactive textile 102.

Figure 5:
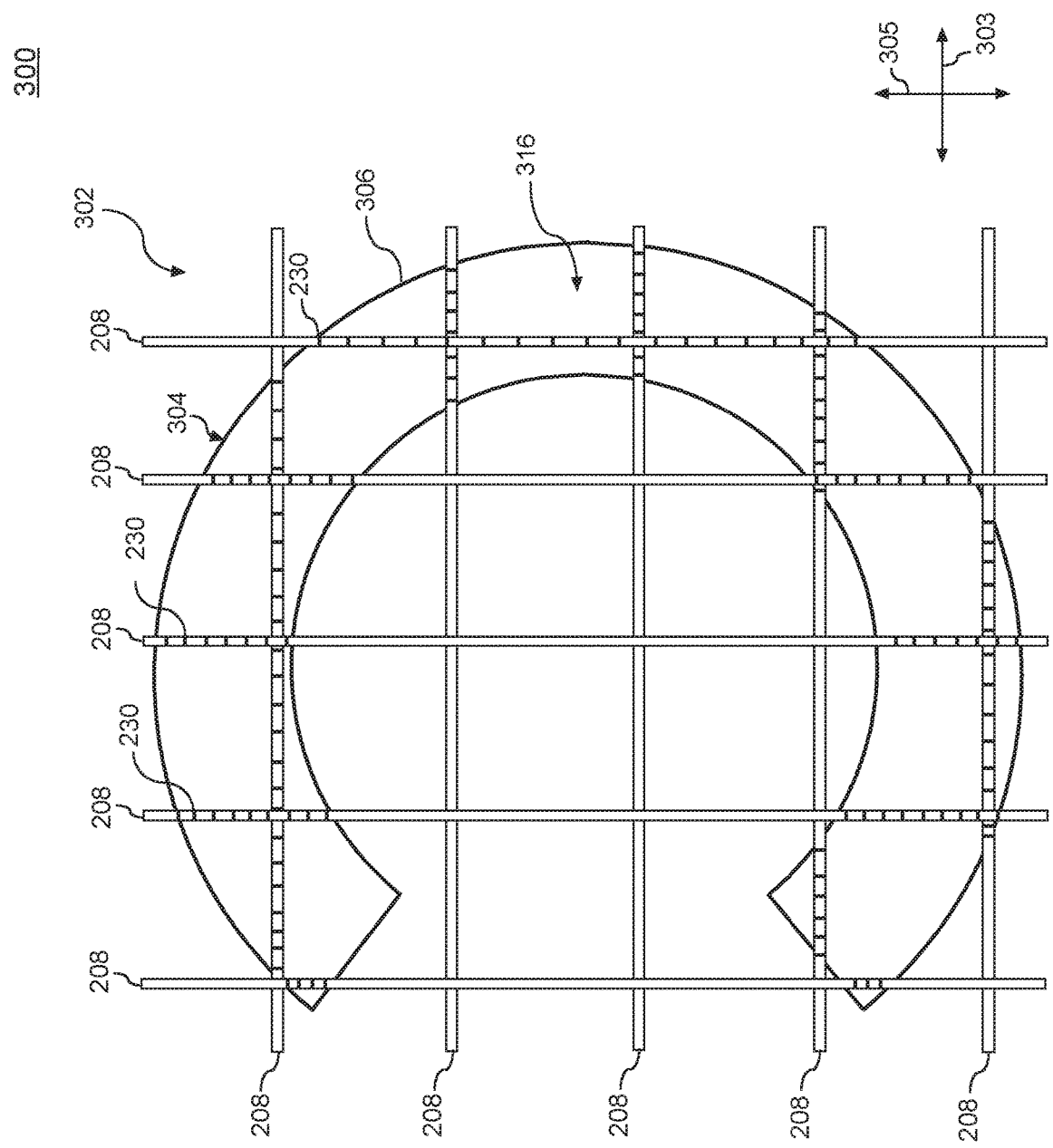
FIG. 5 depicts an example of a back surface of an interactive textile including conductive threads that are conformal to an embroidered thread pattern in accordance with example embodiments of the present disclosure.

The conductive threads 208 can be sewn onto the textile 102 in any suitable pattern or array. In one embodiment, for instance, the conductive threads 208 may form a single series of parallel threads. For instance, in one embodiment, the capacitive touch sensor may comprise a single plurality of parallel conductive threads conveniently located on the interactive object, such as on the sleeve of a jacket. While conductive threads 208 are illustrated as being spaced out from each other in FIG. 3, it is to be noted that conductive threads 208 may be embroidered very closely together. For example, in some cases two or three conductive threads may be embroidered closely together in each direction. In this particular example, the conductive threads may be oriented as parallel sensing lines that do not cross or intersect with each other. In an alternative embodiment, the conductive threads 208 may form a grid as shown in FIG. 5.

In example 300, sensing circuitry 210 is shown as being integrated within object 104, and is directly connected to conductive threads 208. During operation, sensing circuitry 210 can determine positions of touch-input on the set of conductive threads 208 using self-capacitance sensing, projective capacitive sensing, or mutual capacitance sensing.

For example, when configured as a self-capacitance sensor, sensing circuitry 210 charges conductive threads 208 by applying a control signal (e.g., a sine signal) to each conductive thread 208. When an object, such as the user's finger, touches the conductive thread 208, the conductive threads 208 that are touched are grounded, which changes the capacitance (e.g., increases or decreases the capacitance) on the touched conductive threads 208.

Sensing circuitry 210 uses the change in capacitance to identify the presence of the object. To do so, sensing circuitry 210 detects a position of the touch-input by detecting which conductive thread 208 is touched by detecting changes in capacitance of the respective conductive thread 208. Sensing circuitry 210 uses the location of the conductive thread that is touched to determine the position of the touch-input on the set of conductive threads 208.

The conductive thread 208 and sensing circuitry 210 are configured to communicate the touch data that is representative of the detected touch-input to removable electronics module 206, which is removably coupled to interactive object 104 via communication interface 222. The microprocessor 212 may then cause communication of the touch data, via network interface 216, to computing device 106 to enable the device to determine gestures based on the touch data, which can be used to control object 104, computing device 106, or applications implemented at computing device 106. The computing device 106 can be implemented to recognize a variety of different types of gestures, such as touches, taps, swipes, holds, and covers made to interactive textile 102.

According to some implementations, a set of conductive fibers with electronics such as an internal electronics module and/or connector for a removable electronics module may be incorporated into a contained assembly that can be applied to objects such as garments, etc. The assembly may include a flexible substrate having a set of conductive threads attached thereto. Additionally, an internal electronics module and/or connector for a removable electronics module can be attached to the flexible substrate. In some examples, an embroidered thread pattern can be formed on a front surface of the flexible substrate. The flexible substrate including the embroidered thread pattern, set of conductive fibers, and electronics may then be attached to an object such as a garment using glue, tape, a hook and loop fastener, sewing, or another technique. In other examples, the flexible substrate including set of conductive fibers and electronics can be attached to a garment, followed by forming the embroidered thread pattern.

Figure 4:
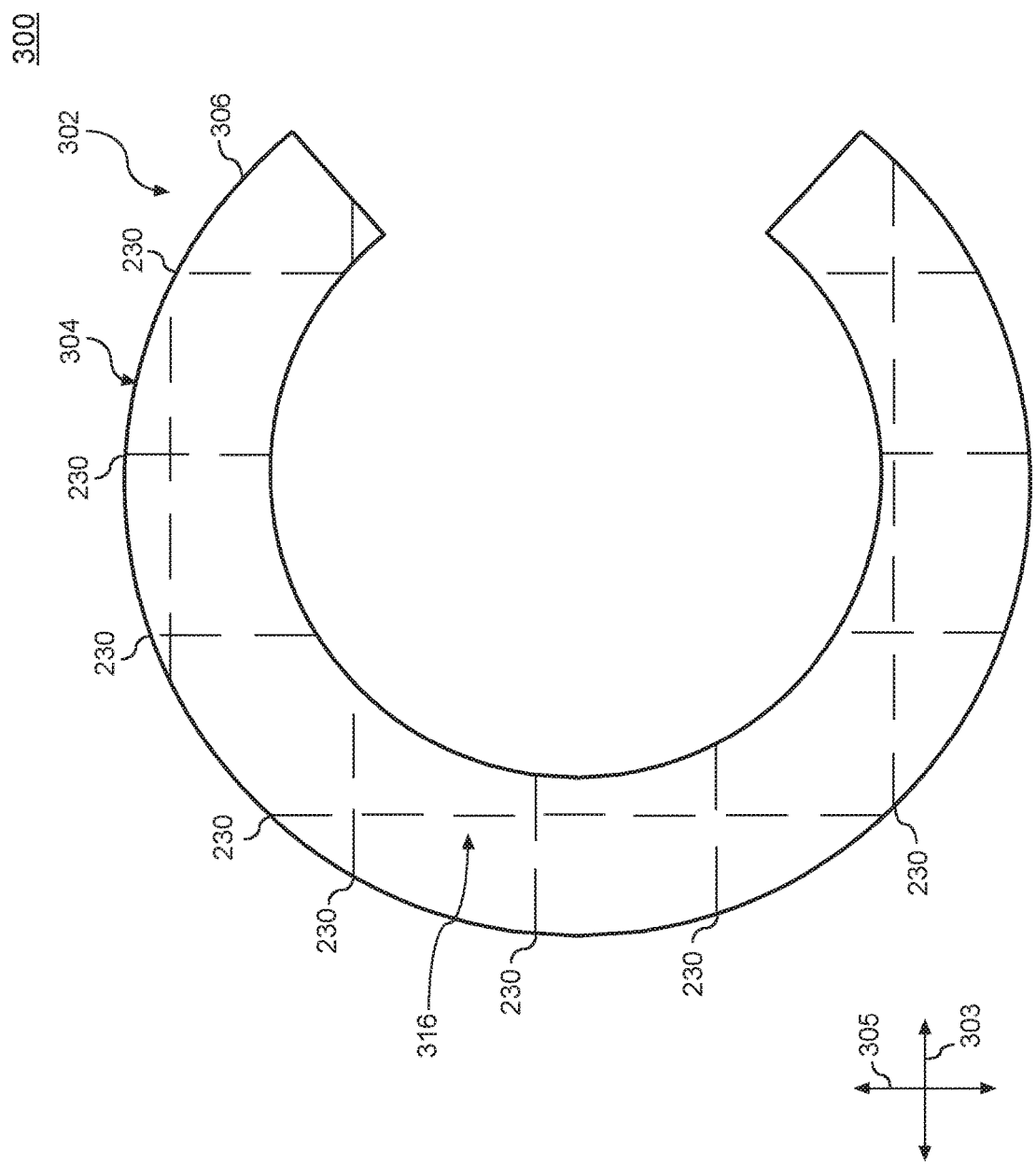
FIG. 4 depicts an example of a front surface of an interactive textile including conductive threads that are conformal to an embroidered thread pattern in accordance with example embodiments of the present disclosure.

Various approaches for forming interactive textiles that include conductive fibers that are conformal to an ornamental feature defined by an embroidered thread pattern in accordance with example embodiments are described. FIG. 4 is a front view of an interactive textile 300 comprising an embroidered thread pattern 304 that defines an ornamental feature 302 on a first surface of a flexible substrate. The interactive textile 300 may define a lateral direction 303 and a longitudinal direction 305. The flexible substrate is not illustrated in FIG. 4 and the subsequent figures for sake of clarity. FIG. 5 depicts a back view of the interactive textile 300 of FIG. 4. Embroidered thread pattern 304 includes one or more embroidery threads affixed to the flexible substrate using one or more embroidery processes. In this example, the embroidered thread pattern 304 includes threads that form an edge 306 defining a 'C-shape' ornamental pattern 302.

With reference to the back view of FIG. 5, conductive threads 208 are coupled to the flexible substrate at an area corresponding to the embroidered thread pattern to form capacitive touch sensor 316. In this example, conductive threads 208 are embroidered to the flexible substrate using one or more embroidery threads 230. Embroidery threads 230 pass from the back surface of the flexible substrate to the front surface, forming a pattern as shown on the front surface shown in FIG. 4. As illustrated, each of the conductive threads is embroidered to the flexible substrate at locations inside the embroidered edge 306. More particularly, each conductive thread 208 includes an embroidered portion and a non-embroidered portion. The embroidered portion of each conductive thread 208 includes at least one end that terminates at or within the embroidered edge. In this manner, the embroidered portion of each conductive thread 208 is selectively coupled to the flexible substrate at the area of the ornamental feature. Accordingly, the conductive threads form a conductive thread pattern that is conformal to the ornamental feature defined by the embroidered thread pattern. Although FIGS. 4 and 5, and the other interactive textiles describer hereinafter, provide examples with respect to conductive threads, it will be appreciated that other conductive fibers such as fiber optics and the like may be formed in similar manners.

Conductive threads 208 are embroidered onto interactive textile 300 to form a grid that includes a first set of substantially parallel conductive threads 208 and a second set of substantially parallel conductive threads 208 that cross the first set of conductive threads to form the grid. In this example, the first set of conductive threads 208 are oriented in a lateral direction 303 (e.g., horizontally) and the second set of conductive threads 208 are oriented in a longitudinal direction 305 (e.g., vertically), such that the first set of conductive threads 208 are positioned substantially orthogonal to the second set of conductive threads 208. It will be appreciated, however, that conductive threads 208 may be oriented such that crossing conductive threads 208 are not orthogonal to each other. For example, in some cases crossing conductive threads 208 may form a diamond-shaped grid. While conductive threads 208 are illustrated as being spaced out from each other in FIG. 5, it is to be noted that conductive threads 208 may be formed very closely together. For example, in some cases two or three conductive threads may be formed closely together in each direction. Further, in some cases the conductive threads may be oriented as parallel sensing lines that do not cross or intersect with each other.

When implemented as a self-capacitance sensor, "ghosting" may occur when multi-touch-input is received. Consider, for example, that a user touches the grid of conductive thread 202 with two fingers. When this occurs, sensing circuitry 210 may determine X and Y coordinates for each of the two touches. However, sensing circuitry 210 may be unable to determine how to match each X coordinate to its corresponding Y coordinate. For example, if a first touch has the coordinates X1, Y1 and a second touch has the coordinates X4,Y4, sensing circuitry 210 may also detect "ghost" coordinates X1, Y4 and X4,Y1.

In one or more implementations, sensing circuitry 210 is configured to detect "areas" of touch-input corresponding to two or more touch-input points on the grid of conductive thread 202. Conductive threads 202 may be formed closely together such that when an object touches the grid of conductive thread 202, the capacitance will be changed for multiple horizontal conductive threads 208 and/or multiple vertical conductive threads 208. For example, a single touch with a single finger may generate the coordinates X1,Y1 and X2,Y1. Thus, sensing circuitry 210 may be configured to detect touch-input if the capacitance is changed for multiple horizontal conductive threads 208 and/or multiple vertical conductive threads 208. Note that this removes the effect of ghosting because sensing circuitry 210 will not detect touch-input if two single-point touches are detected which are spaced apart.

Alternately, when implemented as a projective capacitance sensor, sensing circuitry 210 can charge a single set of conductive threads 208 (e.g., horizontal conductive threads 208) by applying a control signal (e.g., a sine signal) to the single set of conductive threads 208. Then, sensing circuitry 210 senses changes in capacitance in the other set of conductive threads 208 (e.g., vertical conductive threads 208).

In this implementation, vertical conductive threads 208 are not charged and thus act as a virtual ground. However, when horizontal conductive threads 208 are charged, the horizontal conductive threads capacitively couple to vertical conductive threads 208. Thus, when an object, such as the user's finger, touches the grid of conductive thread 208, the capacitance changes on the vertical conductive threads (e.g., increases or decreases). Sensing circuitry 210 uses the change in capacitance on vertical conductive threads 208 to identify the presence of the object. To do so, sensing circuitry 210 detects a position of the touch-input by scanning vertical conductive threads 208 to detect changes in capacitance. Sensing circuitry 210 determines the position of the touch-input as the intersection point between the vertical conductive thread 208 with the changed capacitance, and the horizontal conductive thread 208 on which the control signal was transmitted. For example, sensing circuitry 210 can determine touch data by determining the position of each touch as X,Y coordinates on the grid of conductive thread 208.

Whether implemented as a self-capacitance sensor or a projective capacitance sensor, the conductive thread 208 and sensing circuitry 210 is configured to communicate the touch data that is representative of the detected touch-input to removable electronics module 206, which is removably coupled to interactive object 104 via communication interface 222. The microprocessor 212 may then cause communication of the touch data, via network interface 216, to computing device 106 to enable the device to determine gestures based on the touch data, which can be used to control object 104, computing device 106, or applications implemented at computing device 106.

Sensing circuitry 210, removable electronics module 206, and/or a computing device 106 can be implemented to recognize a variety of different types of gestures, such as touches, taps, swipes, holds, and covers made to interactive textile 102. To recognize the various different types of gestures, the device can be configured to determine a duration of the touch, swipe, or hold (e.g., one second or two seconds), a number of the touches, swipes, or holds (e.g., a single tap, a double tap, or a triple tap), a number of fingers of the touch, swipe, or hold (e.g., a one finger-touch or swipe, a two-finger touch or swipe, or a three-finger touch or swipe), a frequency of the touch, and a dynamic direction of a touch or swipe (e.g., up, down, left, right). With regards to holds, the device can also determine an area of the grid of conductive thread 202 that is being held (e.g., top, bottom, left, right, or top and bottom. Thus, the device 106 can recognize a variety of different types of holds, such as a cover, a cover and hold, a five finger hold, a five finger cover and hold, a three finger pinch and hold, and so forth.

Figure 6:
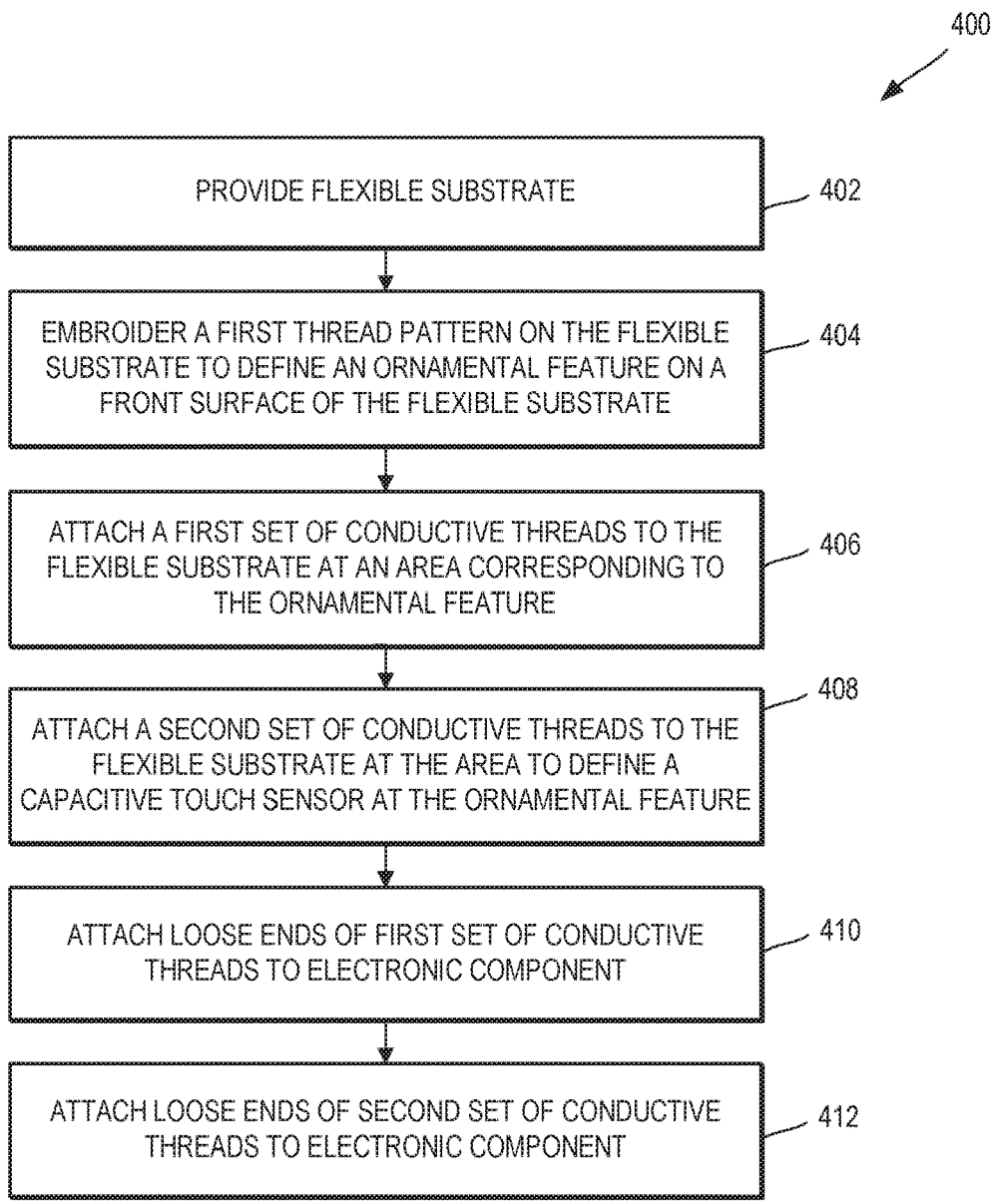
FIG. 6 is a flowchart depicting an example method of manufacturing an interactive textile in accordance with example embodiments of the present disclosure.

FIG. 6 is a flowchart depicting an example method 400 of manufacturing an interactive textile that includes conductive threads conformal to an embroidered thread pattern in accordance with example embodiments. Although FIG. 6 depicts steps performed in a particular order for purposes of illustration and discussion, method 400 of FIG. 6 and the other methods (e.g., method 450) described hereinafter are not limited to the particularly illustrated order or arrangement. The various steps of the methods disclosed herein can be omitted, rearranged, combined, and/or adapted in various ways without deviating from the scope of the present disclosure.

At (402), a flexible substrate is provided. In example embodiments, the flexible substrate may include a textile such as a woven fabric or other materials such as flexible plastics, films, etc. In some implementations, a flexible substrate may be provided on a work surface of a machine such as a sewing or embroidery machine configured to embroidered threads on to the flexible substrate.

At (404), a first thread pattern is embroidered on the flexible substrate. One or more threads may be used to embroider the first thread pattern on a front surface of the flexible substrate. The first thread pattern may define an ornamental feature on the front surface of the flexible substrate. It is noted that while the embroidered thread pattern is provided on the front surface of the flexible substrate, one or more threads of the embroidered thread pattern may extend through the flexible substrate to a back surface opposite the front surface.

At (406), a first set of conductive threads is attached to the flexible substrate at an area corresponding to the ornamental feature defined by the embroidered thread pattern. In some examples, the first of the conductive threads can be embroidered to the flexible substrate. In some implementations, the first set of conductive threads are embroidered to the back surface of the flexible substrate at an area corresponding to the ornamental feature defined by the embroidered thread pattern on the front surface. Although principally described as being embroidered to the flexible substrate, the conductive threads may be affixed to the flexible substrate using other techniques, such as by gluing, fastening, stapling, sewing by other techniques, etc. The first set of conductive threads are formed conformal to the ornamental feature defined by embroidered thread pattern. For example, the first set of conductive threads may include embroidered portions that are affixed to the flexible substrate at areas within one or more embroidered edges defining the ornamental feature. The first set of conductive threads may not be affixed to the flexible substrate at areas outside of the embroidered edges such that the set of conductive threads define at least a portion of a conductive thread pattern that is conformal to the ornament feature. In some examples, one or more of the first set of conductive threads may be aligned with an edge of the ornamental feature. In other examples, one or more of the first set of conductive threads may be formed with an offset including a spacing from an edge of the ornamental feature. The conductive threads may be formed with one or more curves that follow a curve defined by an edge of the ornamental feature.

At (408), a second set of conductive threads is attached to the flexible substrate at the area corresponding to the ornamental feature defined by the embroidered thread pattern. It is noted that 408 is optional as a capacitive touch sensor may be formed using a single set of conductive threads. Similar to the first set of threads, the second set of conductive threads may be embroidered to the back surface of the flexible substrate at the area corresponding to the ornamental feature. In other examples, however, other techniques may be used to affix the conductive threads to the flexible substrate. The second set of conductive threads are formed conformal to the one ornamental feature defined by the embroidered thread pattern similar to the first of conductive threads. It is noted, however, that the second set of conductive threads need not define the same contours as the first set of conductive threads. For example, the first of conductive threads may be conformal to a first portion of the ornamental feature while a second set of conductive threads are conformal to a second portion of the ornament feature. By way of example, the embroidered portion of the first of conductive threads may terminate at a first edge of the ornamental feature while the embroidered portion of the second set of conductive threads may terminate at a second edge of the ornamental feature. Numerous variations and techniques may be used to form a second set of conductive threads that are conformal to an embroidered thread pattern while forming a first set of conductive threads that are conformal to the same embroidered thread pattern.

At (410), the loose ends of each of the conductive threads of the first set are attached to one or more electronic components. At (412), the loose ends of the second set of conductive threads are attached to the one or more electronic components. In some examples the first set of conductive threads and the second set of conductive threads are attached to the same electronic component. In other examples, the second set of conductive threads may be attached to a different electronic component than the first set of conductive threads. The conductive threads may be attached directly to sensing circuitry in some examples. In other examples, the conductive threads may be attached to one or more connectors that connect to sensing circuitry. By way of example, the loose ends of the first set or the second set of conductive threads can be collected and organized into a ribbon to provide a pitch that matches a corresponding pitch of the connection point of the electronic component. Non-conductive material of the conductive threads of the ribbon can be stripped to expose the conductive wires with conductive threads. After stripping the nonconductive material, the connection points of the electronic component can be attached to the conductive wires. By way of example, connection points of the electronic component can be bonded to the conductive wires of a ribbon. The conductive threads proximate the ribbon can then sealed using a UV-curable or heat-curable epoxy, and the electronic component and the ribbon are encapsulated to the interactive textile with a water-resistant material, such as plastic or polymer.

Figure 7:
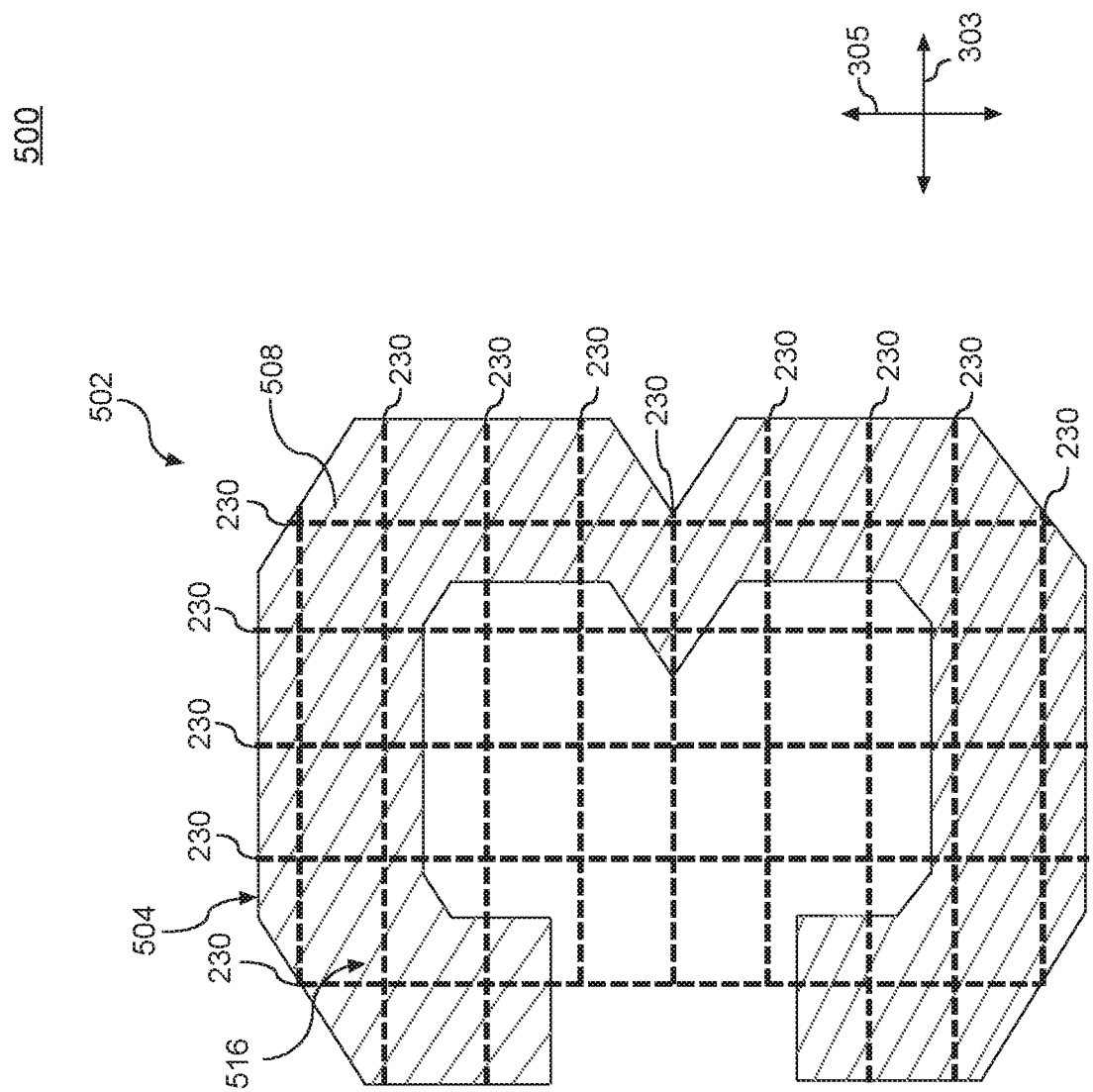
FIG. 7 depicts an example of a front surface of an interactive textile including conductive threads that are conformal to an embroidered thread pattern in accordance with example embodiments of the present disclosure.
Figure 8:
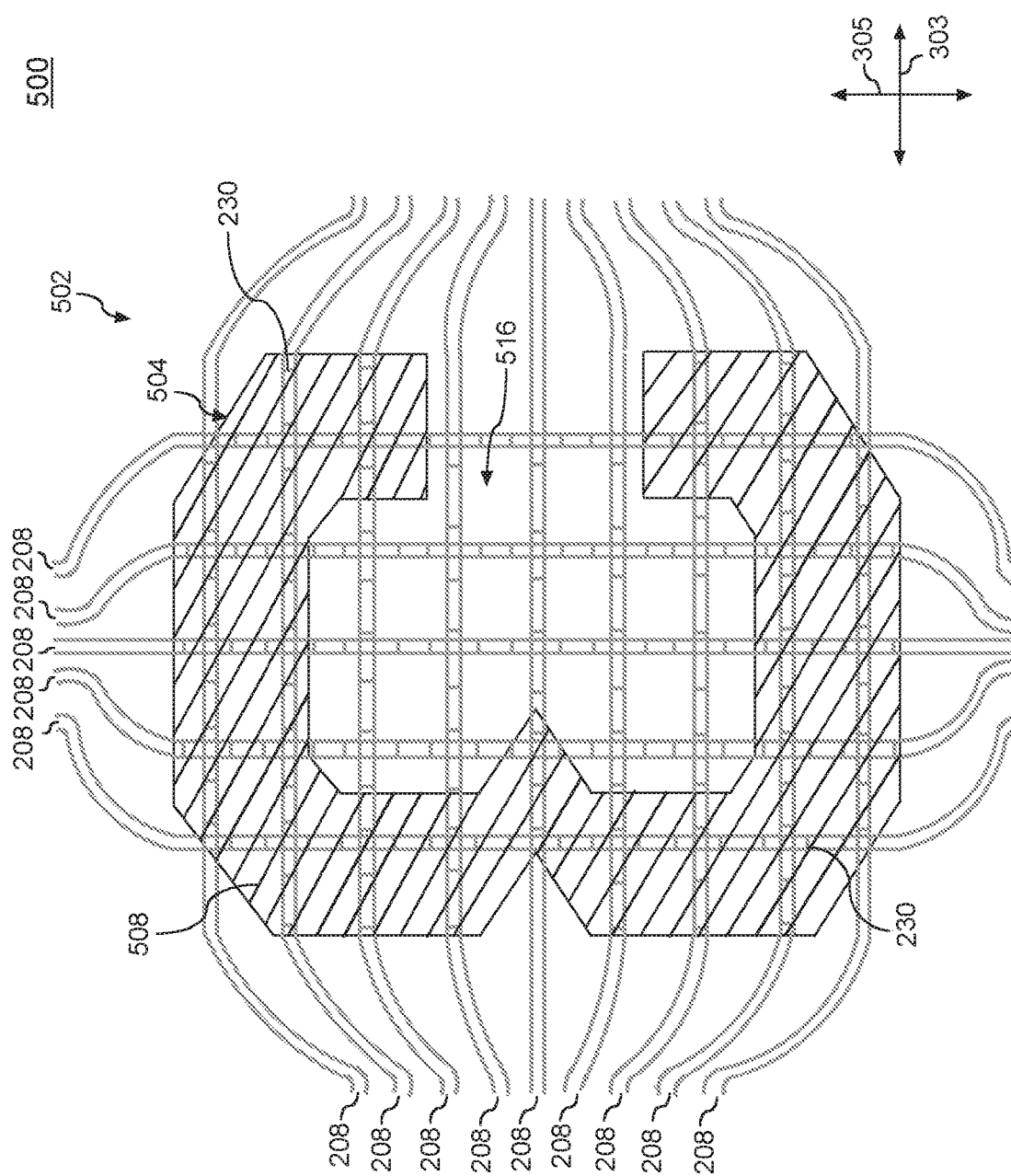
FIG. 8 depicts an example of a back surface of an interactive textile including conductive threads that are conformal to an embroidered thread pattern in accordance with example embodiments of the present disclosure.

According to some implementations, one or more threads of an embroidered thread pattern may be used to affix a set of conductive threads to a flexible substrate having an embroidered thread pattern that defines an ornamental feature. FIGS. 7 and 8 depict a front view and back view, respectively, of an interactive textile 500 comprising an embroidered thread pattern 504 that defines an ornamental feature 502 on a first surface of a flexible substrate. Embroidered thread pattern 504 includes one or more embroidery threads affixed to the flexible substrate using one or more embroidery processes. In this example, the embroidered thread pattern 504 includes threads 508 that form an embroidered surface defining a number '3' shape as ornamental feature 502.

With reference to the back view of FIG. 8, conductive threads 208 are coupled to the flexible substrate at an area corresponding to the embroidered thread pattern. In this example, conductive threads 208 are embroidered to the flexible substrate using one or more embroidery threads 230. Embroidery threads 230 pass from the back surface of the flexible substrate to the front surface, forming a pattern as shown in the front view of FIG. 7. As illustrated, each of the conductive threads is embroidered to the flexible substrate at locations inside the embroidered edge defining the number '3'. In this particular example, the conductive threads are additionally embroidered to the flexible substrate at locations outside of the embroidered edge. More particularly, each conductive thread is embroidered to the substrate to form a grid that includes the embroidered thread pattern and an additional area to form an approximate rectangular shape for the capacitive touch sensor 516. Nevertheless, each conductive thread remains conformal to the embroidered thread pattern. For instance, each conductive thread 208 includes an embroidered portion and a non-embroidered portion. The embroidered portion of each conductive thread 208 includes at least one end that terminates at or within the embroidered edge forming the '3'. In this manner, the embroidered portion of each conductive thread 208 is selectively coupled to the flexible substrate at the area of the ornamental feature. Accordingly, the conductive threads form a conductive thread pattern that is conformal to the ornamental feature defined by the embroidered thread pattern.

The capacitive touch sensor 516 depicted in FIG. 7 can be formed by first forming the conductive threads, then embroidering at least a portion of the embroidered thread pattern 504. As illustrated in FIG. 8, embroidery threads 508 of the embroidered thread pattern cross over the conductive threads 208 at the back surface. More particularly, the conductive threads can be positioned adjacent to the back surface of the flexible substrate. The embroidered thread pattern can then be applied. In this manner, the conductive threads will be positioned between the back surface of the flexible substrate and the non-visible portion of the embroidered threads 508 at the back surface.

Figure 9:
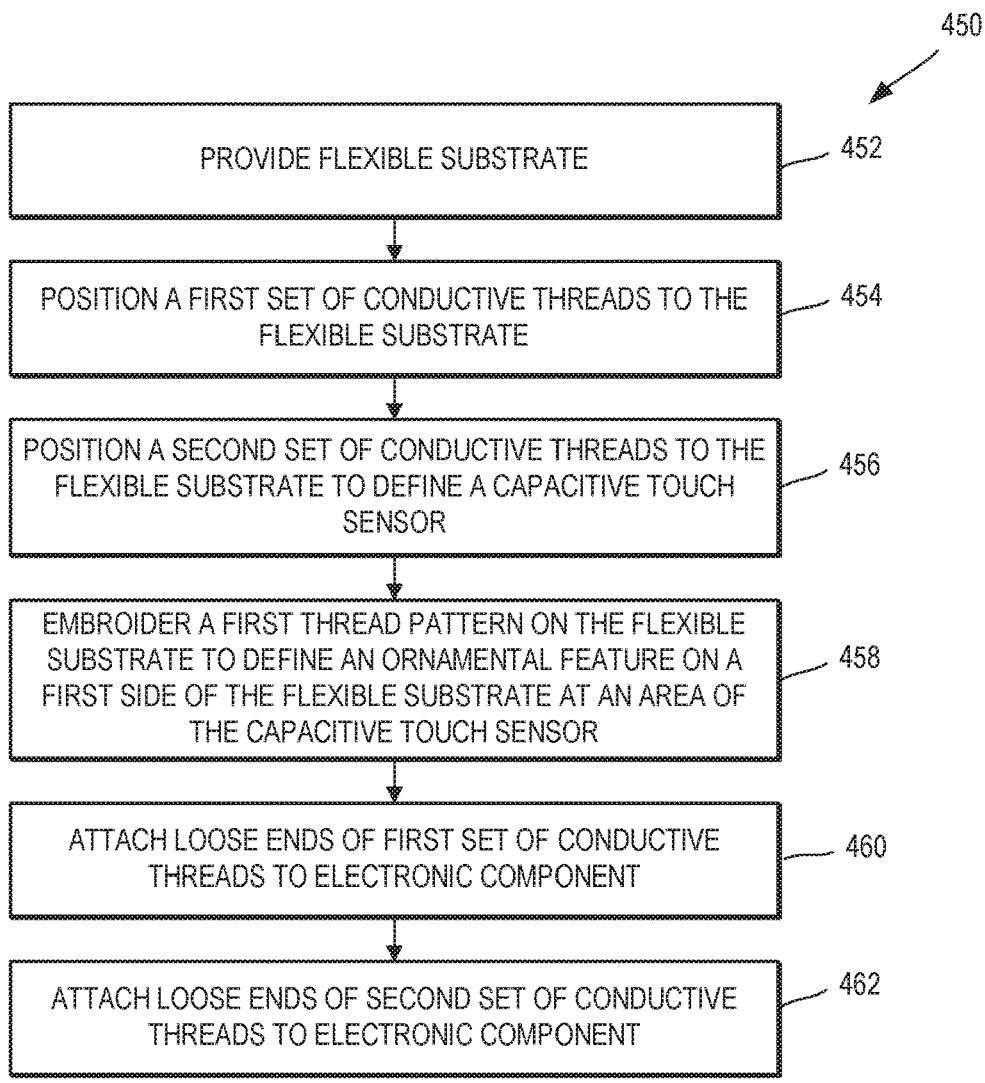
FIG. 9 is a flowchart depicting an example method of manufacturing an interactive textile in accordance with example embodiments of the present disclosure.

FIG. 9 is a flowchart depicting an example method 450 of making an interactive textile that includes conductive threads conformal to an embroidered thread pattern in accordance with example embodiments. In the example method 450, an embroidered thread pattern can be formed after positioning conductive threads relative to the substrate. Nevertheless, the resulting conductive thread pattern can be conformal the embroidered thread pattern.

At (452), a flexible substrate is provided. At (454), a first set of conductive threads is positioned on the back surface of the flexible substrate at an area corresponding to a desired placement of an ornamental feature defined by an embroidered thread pattern. In some examples, the first of the conductive threads can be embroidered to the flexible substrate or affixed to the flexible substrate using other techniques. In other examples, the first set of conductive threads may be positioned on the back surface of the flexible substrate without being physically attached at 454.

At (456), a second set of conductive threads is positioned on the back surface of the flexible substrate at the area corresponding to the desired placement of the ornamental feature. Similar to the first set of threads, the second set of conductive threads may be embroidered or affixed to the back surface of the flexible substrate at the area corresponding to the desired placement feature. In other examples, however the second set of conductive threads may be positioned on the back surface without being physically attached to the flexible substrate. Although method 450 describes forming a second set of conductive threads, it will be appreciated that other implementations may include a single set of conductive threads.

At (458), an embroidered thread pattern is formed on the front surface of the flexible substrate at the area corresponding to the positioning of the first set of conductive threads and the second set of conductive threads. One or more threads may be used to embroider the embroidered thread pattern on the front surface of the flexible substrate. The first thread pattern may define an ornamental feature on the front surface of the flexible substrate. It is noted that while the embroidered thread pattern is provided on the front surface of the flexible substrate, one or more threads of the embroidered thread pattern may extend through the flexible substrate hour from a back surface opposite the front surface. More particularly, the one or more threads of the embroidered thread pattern may be used to attach the first set and the second set of conductive threads of the flexible substrate. For example, the embroidery threads of the embroidered that pattern may loop around the conductive threads to form a stitch loop or other fastener out of the embroidery thread. By way of example, FIG. 8 depicts embroidery threads 508 that are formed over conductive threads 208 to attach the conductive threads to the flexible substrate.

The embroidered thread pattern can be formed conformal to the conductive thread pattern defined by the first set of conductive threads and the second set of conductive threads. For example, one or more embroidered edges defining an ornamental feature on the front surface may be formed relative to the first set and/or second set of conductive threads. In some examples, an edge of the ornamental feature may be aligned with one or more of the first set and/or second set of conductive threads. In other examples, one or more edges of an ornamental feature may be formed with an offset from one or more conductive threads. An edge of an ornamental feature may be formed that follow a curve defined by a conductive thread. In some examples, the embroidered thread pattern may be formed with one or more edges that are positioned at an end of an embroidered portion of a conductive thread. For example, a conductive thread may be embroidered to the flexible substrate at a portion of the conductive thread and not embroidered to the flexible substrate at another portion. The embroidered thread pattern may be formed with one or more edges that are positioned at the end of the embroidered portion of the conductive thread such that the resulting touch sensor is aligned with the embroidered thread pattern edge.

At (410), the loose ends of each of the conductive threads of the first set are attached to one or more electronic components. At (412), the loose ends of the second set of conductive threads are attached to the one or more electronic components.

Figure 10:
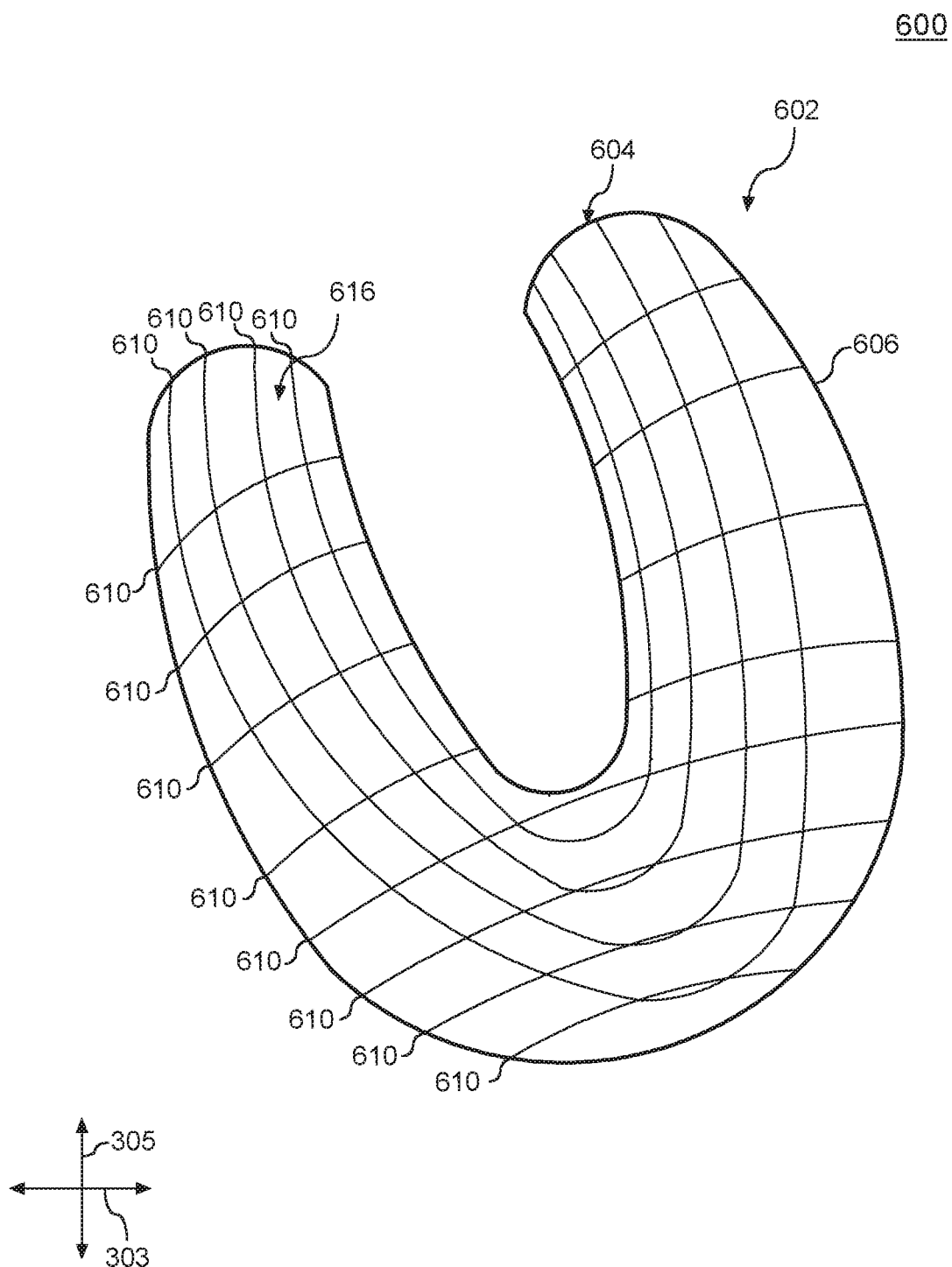
FIG. 10 depicts an example of a front surface of an interactive textile including conductive threads that are conformal to an embroidered thread pattern in accordance with example embodiments of the present disclosure.
Figure 11:
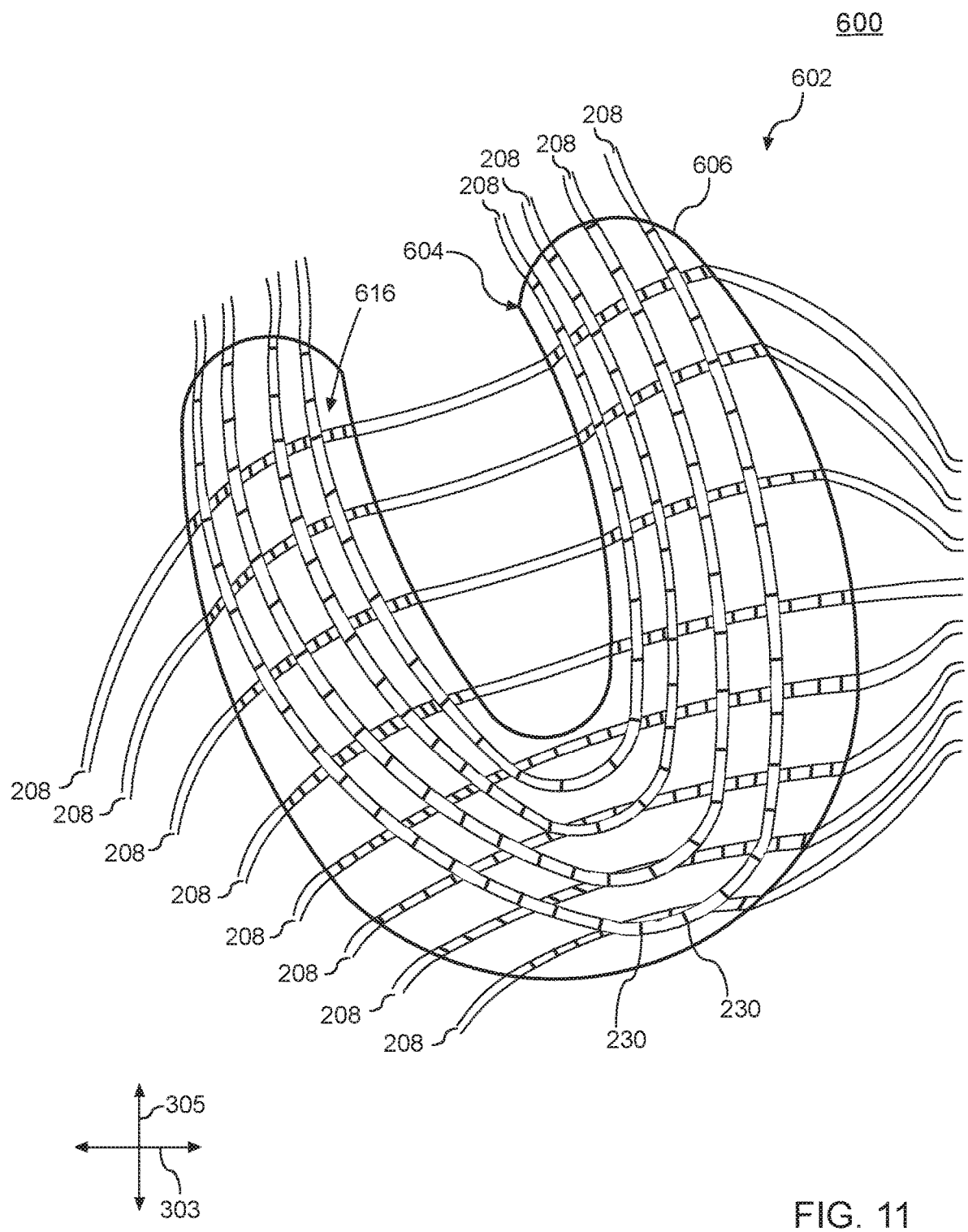
FIG. 11 depicts an example of a back surface of an interactive textile including conductive threads that are conformal to an embroidered thread pattern in accordance with example embodiments of the present disclosure.

FIGS. 10 and 11 depicts a front view and back view, respectively, of an interactive textile 600 comprising an embroidered thread pattern 604 that defines an ornamental feature 602 on a first surface of a flexible substrate. Embroidered thread pattern 604 includes one or more embroidery threads affixed to the flexible substrate using one or more embroidery processes. In this example, the embroidered thread pattern 604 includes embroidery threads 610 that form embroidered edges or lines that extend substantially in a longitudinal direction and include a curve that defines a U-shape. The embroidered thread pattern 604 includes additional threads 610 that extend substantially in a lateral direction, crossing the threads that form the U-shape. The embroidered thread pattern defines a U-shape ornamental feature 602.

With reference to the back view of FIG. 11, conductive threads 208 are coupled to the flexible substrate at an area corresponding to the embroidered thread pattern 604 to form a capacitive touch sensor 616. In this example, conductive threads 208 are embroidered to the flexible substrate using one or more embroidery threads 230. Embroidery threads 230 may pass from the back surface of the flexible substrate to the front surface, but are overlaid with the embroidery threads 610. As illustrated, each of the conductive threads is embroidered to the flexible substrate at locations inside the embroidered edge defining the U-shape. Outside of the U-shape, the conductive threads are not embroidered to the flexible substrate, thus conforming the resulting capacitive touch sensor 616 to the ornamental feature defined by the embroidered thread pattern 604.

In some examples, threads 610 of embroidered thread pattern 604 can be embroidered to the flexible substrate after forming the set of conductive threads 208. In such an example, threads 610 may extend outward from the back surface of the flexible substrate to couple the conductive threads 208 to the flexible substrate. In other examples, conductive threads 208 may be embroidered to the flexible substrate using embroidery threads 230 without being attached using thread 610. For instance, embroidered thread pattern 604 can be formed prior to forming the set of conductive threads 208.

Conductive threads 208 include embroidered portions having ends that terminate at edges of the embroidered thread pattern 604. As illustrated in FIG. 11, conductive threads 208 are not embroidered using embroidery thread 230 at locations outside of the embroidered for a pattern. For example, each of the conductive threads as an embroidered portion that terminates at edge 606 of the U-shape. Additionally, the conductive threads are formed with a curve that is at least partially aligned with edge 606. For example, a first set of conductive threads extend in the longitudinal direction with a curve that substantially mimics the curve of edge 606. The first set of conductive threads are spaced from edge 606 with an offset that includes a substantially equal spacing from edge 606. Each of the conductive threads is spaced apart from adjacent conductive threads to form a conductive thread pattern that matches the embroidered pattern illustrated in FIG. 10. In this manner, the conductive thread pattern is conformal to the embroidered thread pattern The conformal thread pattern illustrated in FIGS. 10 and 11 provides a natural user interface intuitive to users of an interactive textile. The conductive threads are conformal to the embroidered thread pattern providing a visual indication to a user of an input location of the touch sensor. For example, a user may provide a swipe gesture and the longitudinal direction along the embroidered thread pattern to provide input at a portion of the U shape. Similarly, a user may provide a swipe gesture in the lateral direction on the embroidered threat pattern to provide input and a portion of the U-shape.

A touch sensor according to some implementations may include different conductive thread patterns associated with individual portions of an ornamental feature and particular input gestures. For example, a first set of conductive threads can be conformal to a first portion of an embroidered thread pattern and a second set of conductive threads can be conformal to a second portion of the embroidered thread pattern.

Figure 12:
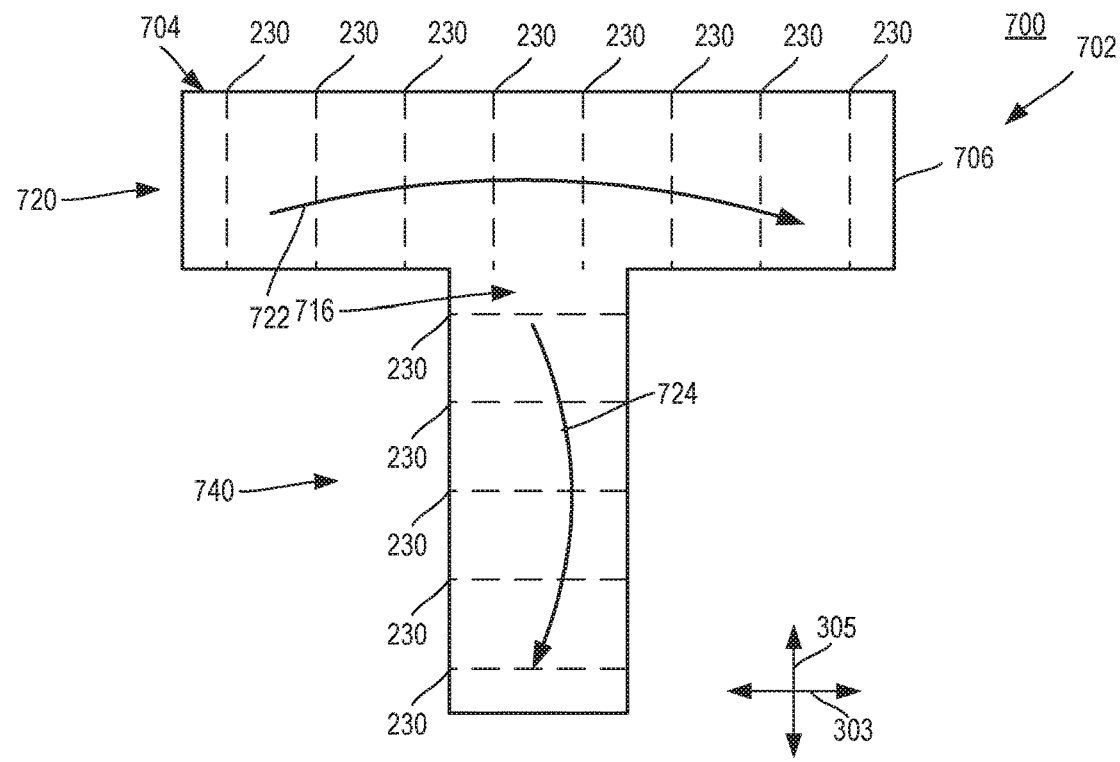
FIG. 12 depicts an example of a front surface of an interactive textile including conductive threads that are conformal to an embroidered thread pattern in accordance with example embodiments of the present disclosure.
Figure 13:
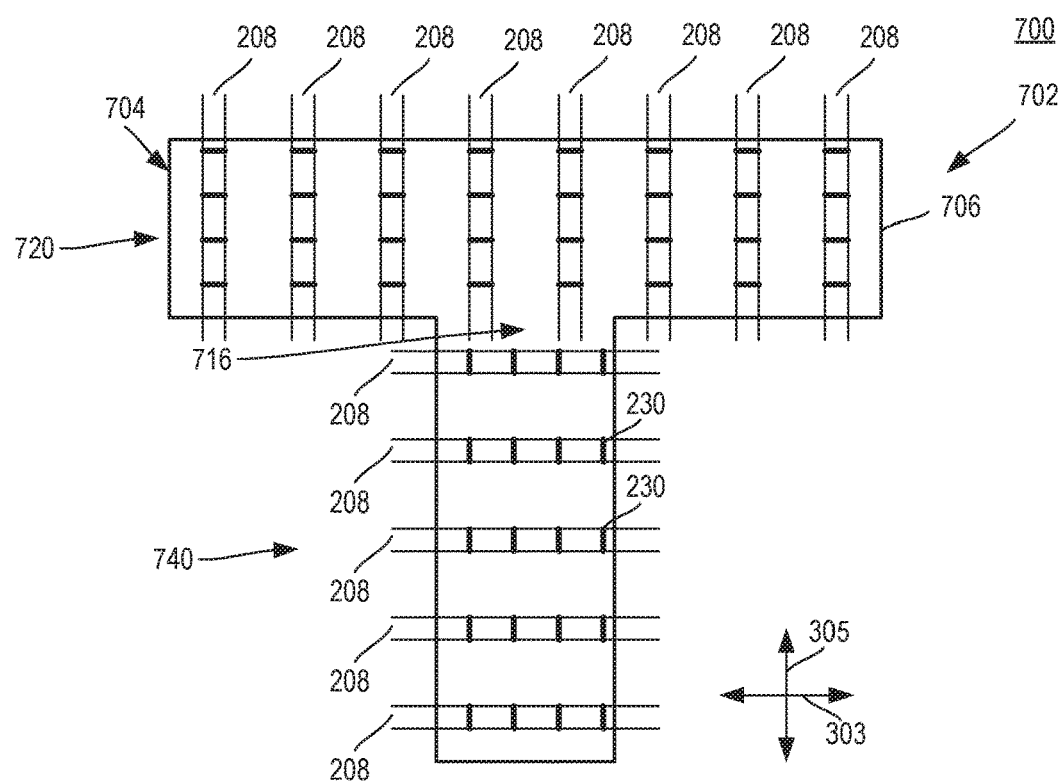
FIG. 13 depicts an example of a back surface of an interactive textile including conductive threads that are conformal to an embroidered thread pattern in accordance with example embodiments of the present disclosure.

FIGS. 12 and 13 depict a front view and back view, respectively, of an interactive textile 700 comprising an embroidered thread pattern 704 that defines an ornamental feature 702 on a first surface of a flexible substrate. Embroidered thread pattern 704 includes an embroidered edge 706 forming an ornamental feature 702 defining of a T-shape.

A capacitive touch sensor 716 is formed that includes a first conductive thread pattern conformal to a first portion of the ornamental feature 702 and a second conductive thread pattern conformal to a second portion of the ornamental feature. A first set of conductive threads 208 extend in the longitudinal direction 305 conformal to a first portion 720 of ornamental feature 702. In this example the first portion 720 corresponds to a lateral extent of the T-shape. The first set of conductive threads 208 are embroidered to the flexible substrate using embroidery threads 230 to define an embroidered portion of each conductive thread. The embroidered portion of each conductive thread has a first end that terminates at a first part of edge 706 and a second end that terminates at or within a second portion of edge 706. In this manner, the first set of conductive threads 208 are formed conformal to the first portion 720 of the ornamental feature 702 defined by embroidered thread pattern 704.

A second set of conductive threads 208 extend in the lateral direction 303 conformal to a second portion 740 of ornamental feature 702. In this example, the second portion 740 corresponds to a longitudinal extent of the T-shape. The second set of conductive threads 208 are embroidered to the flexible substrate using embroidery threads 230 that define an embroidered portion of each conductive thread. The embroidered portion of each conductive thread has a first end that terminates at a first portion of edge 706 and a second portion that terminates at or within a second portion of edge 706. In this manner, the second set of conductive threads 208 are formed conformal to the second portion 740 of the ornamental feature 702 defined by embroidered thread pattern 704.

The capacitive touch sensor 716 in FIGS. 12 and 13 includes two one-dimensional input portions. As illustrated in FIG. 12, for example, the first portion 720 of ornamental feature 702 includes conductive threads that extend longitudinally and are spaced laterally. As such, the portion of capacitive touch sensor 716 at 720 may be configured to be responsive to an input gesture 722. Input gesture 722 may include a swipe or slide gesture that extends in the lateral direction. For example, the interactive textile may be configured to respond to an input gesture 722 received at the first portion 720 of the embroidered thread pattern. More particularly, a gesture manager and/or sensing circuitry may be configured to detect input gesture 722 responsive to a touch sequentially at two or more of the conductive threads 208 that extend longitudinally at portion 720. The gesture manager and/or sensing circuitry may be configured to be non-responsive to an input gesture that includes a swipe or slide that extends in the longitudinal direction 305 at portion 720.

The second portion 740 of ornamental feature 702 includes conductive threads that extend laterally and are spaced longitudinally. As such, the portion of capacitive touch sensor 716 at 740 may be configured to be responsive to an input gesture 724. Input gesture 724 may include a swipe or slide gesture that extends in the longitudinal direction 305. For example, the interactive textile may be configured to respond to an input gesture 724 received at the second portion 740 of the embroidered thread pattern. More particularly, a gesture manager and/or sensing circuitry may be configured to detect input gesture 724 responsive to a touch sequentially at two or more of the conductive threads 208 that extend laterally at portion 740. The gesture manager and/or sensing circuitry may be configured to be non-responsive to an input gesture that includes a swipe or slide that extends in the lateral direction 303.

A touch sensor according to some implementations may include a variable pitch. A pitch associated with a plurality of conductive threads can be varied to adjust the sensitivity of a capacitive touch sensor at different locations of an embroidered thread pattern. The pitch of a set of conductive threads can be varied such that the pitch associated with a first group of the set of conductive threads at a first region of the touch sensor is less than the pitch of a second group of the set conductive threads at a second region of the touch sensor.

Figure 14:
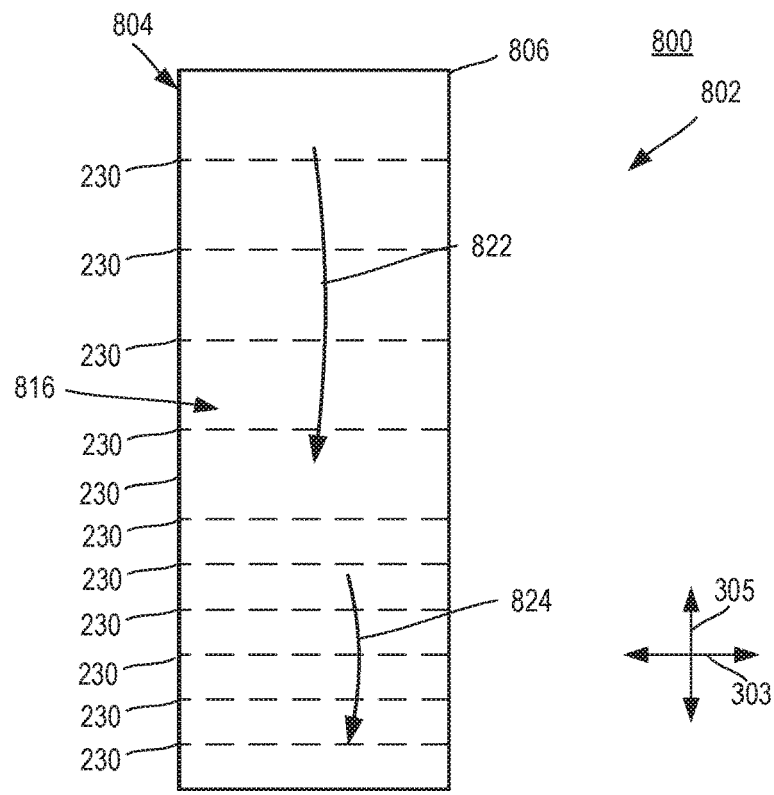
FIG. 14 depicts an example of a front surface of an interactive textile including conductive threads that are conformal to an embroidered thread pattern in accordance with example embodiments of the present disclosure.
Figure 15:
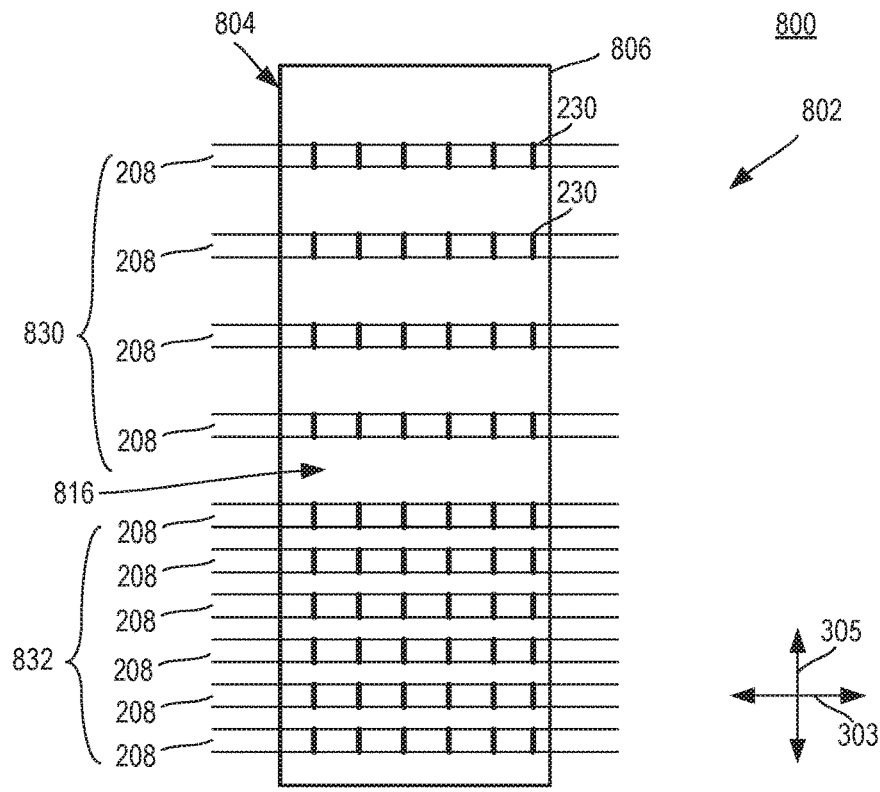
FIG. 15 depicts an example of a back surface of an interactive textile including conductive threads that are conformal to an embroidered thread pattern in accordance with example embodiments of the present disclosure.

FIGS. 14 and 15 depict a front view and back view, respectively, of an interactive textile 800 comprising an embroidered thread pattern 804 that defines an ornamental feature 802 on a first surface of a flexible substrate. Embroidered thread pattern 804 includes an embroidered edge 806 forming an ornamental feature 802 having a rectangular shape.

A capacitive touch sensor 816 is formed that includes a conductive thread pattern conformal to the ornamental feature 802. A set of conductive threads 208 are elongated on the back surface of the flexible substrate in the lateral direction conformal to edge 806. The set of conductive threads 208 are embroidered to the flexible substrate using embroidery threads 230 that define an embroidered portion of each conductive thread. The embroidered portion of each conductive thread has a first end that terminates at a first portion of edge 806 and a second portion that terminates at a second portion of edge 806. In this manner, the first set of conductive threads 208 are formed conformal to the ornamental feature 802 defined by embroidered thread pattern 804.

In the example of FIGS. 14 and 15, the capacitive touch sensor 816 includes conductive threads 208 having a variable pitch. A first subset 830 of the conductive threads 208 have a first pitch while a second subset 832 of the conductive threads 208 have a second pitch that is smaller than the first pitch. The first subset of conductive threads define a first region of the touch sensor that has a lower touch sensitivity than a second region defined by the second subset of conductive threads. Such a technique may be useful to define regions with different sensitivities to touch inputs.

In some implementations, a pitch between individual threads of a capacitive touch sensor can be varied to change the sensitivity of the sensor to touch input. The spacing between threads can decrease along the length of the threads to vary the sensitivity. In this manner, the same threads may be used to create regions of the sensor with different sensitivities. For instance, a first conductive thread can be separated from a second conductive thread by a spacing in a first direction that is orthogonal to a length of the first conductive thread and a length of the second conductive thread. The spacing between the first conductive thread and the second conductive thread can be decreased along the length of the first conductive thread and the length of second conductive thread. In this manner, the touch input sensor can have a variable touch sensitivity that is dependent on the spacing between the first conductive thread and the second conductive thread.

Figure 16:
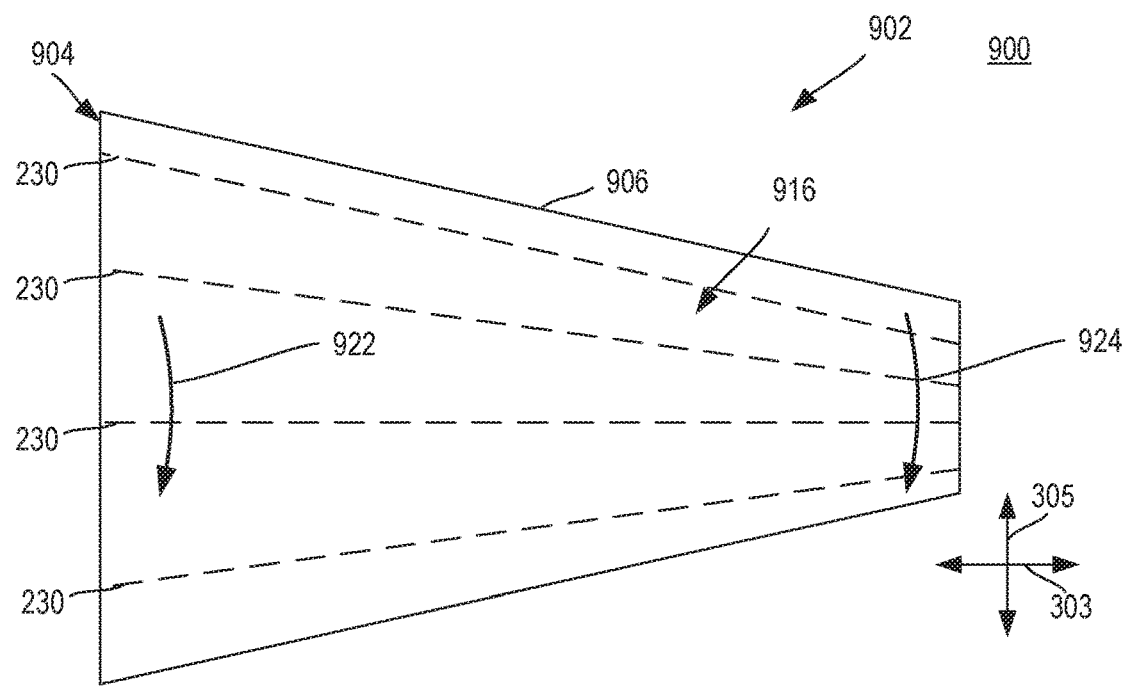
FIG. 16 depicts an example of a front surface of an interactive textile including conductive threads that are conformal to an embroidered thread pattern in accordance with example embodiments of the present disclosure.
Figure 17:
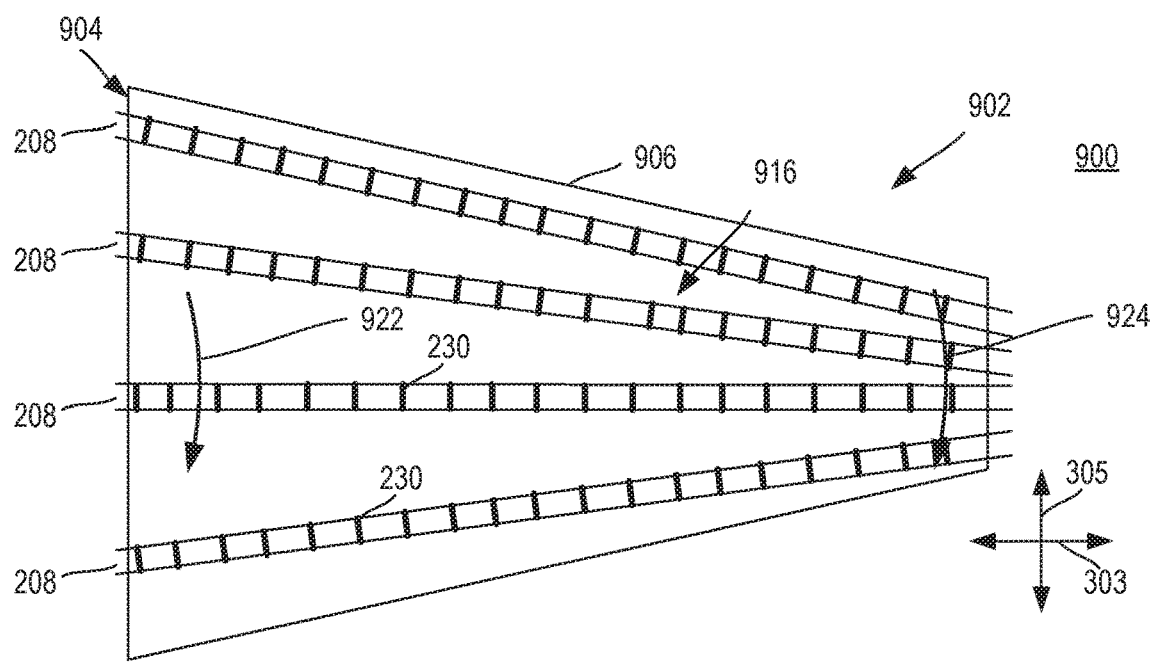
FIG. 17 depicts an example of a back surface of an interactive textile including conductive threads that are conformal to an embroidered thread pattern in accordance with example embodiments of the present disclosure.

FIGS. 16 and 17 depict a front view and back view, respectively of an interactive textile 900 illustrating a capacitive touch sensor 916 having a sensitivity that varies based on a variable pitch between individual conductive threads. Interactive textile 900 comprises an embroidered thread pattern 904 that defines an ornamental feature 902 on a first surface of a flexible substrate. Embroidered thread pattern 904 includes an embroidered edge 906 forming an ornamental feature 902 having a polygonal shape.

A capacitive touch sensor 916 is formed that includes a conductive thread pattern conformal to the ornamental feature 902. A set of conductive threads 208 are elongated on the back surface of the flexible substrate in the lateral direction 303. The set of conductive threads 208 are embroidered to the flexible substrate using embroidery threads 230 that define an embroidered portion of each conductive thread. The embroidered portion of each conductive thread has a first end that terminates at a first portion of edge 906 and a second portion that terminates at a second portion of edge 906. In this manner, the set of conductive threads 208 is formed conformal to the first portion the ornamental feature 902 defined by embroidered thread pattern 904.

The spacing between threads in the longitudinal direction varies along the length of the conductive threads in the lateral direction. More particularly, the pitch decreases along the lengths of the threads from left to right in the lateral direction relative to the page. As such, the capacitive touch sensor 916 will have a lower sensitivity to touch input at locations closer to the left edge and a higher sensitivity to touch input at locations closer to the right edge. For instance, an input gesture 922 may be provided where the sensitivity is lower. Input gesture 922 includes a touch swipe in the longitudinal direction that crosses a single conductive thread 208 and thus may be insufficient to trigger a detection of gesture 922. An input gesture 924 may be provided where the sensitivity is higher. The input gesture 924 includes a touch swipe in the longitudinal direction the crosses four conductive threads 208. Notably, the length of the gesture 922 and gesture 924 is the same. However, because of the input location gesture 922 may not be detected while gesture 924 is detected. Although the example depicted in FIGS. 16 and 17 shows a steadily decreasing pitch, other variations are possible. For example, the pitch may decrease and then increase again in some examples. In this manner, specific intensities can be provided in specific locations within the capacitive touch sensor.

In some implementations, an embroidered thread pattern may provide a visual and/or haptic textural indication to indicate touch gesture directions. For example, an embroidered stitch pattern may indicate to a user where to provide input and in what direction to provide input. Directional stitches can be applied for visual and/or haptic cues to inform a user and guide a user's fingers in a gesture input direction.

Figure 18:
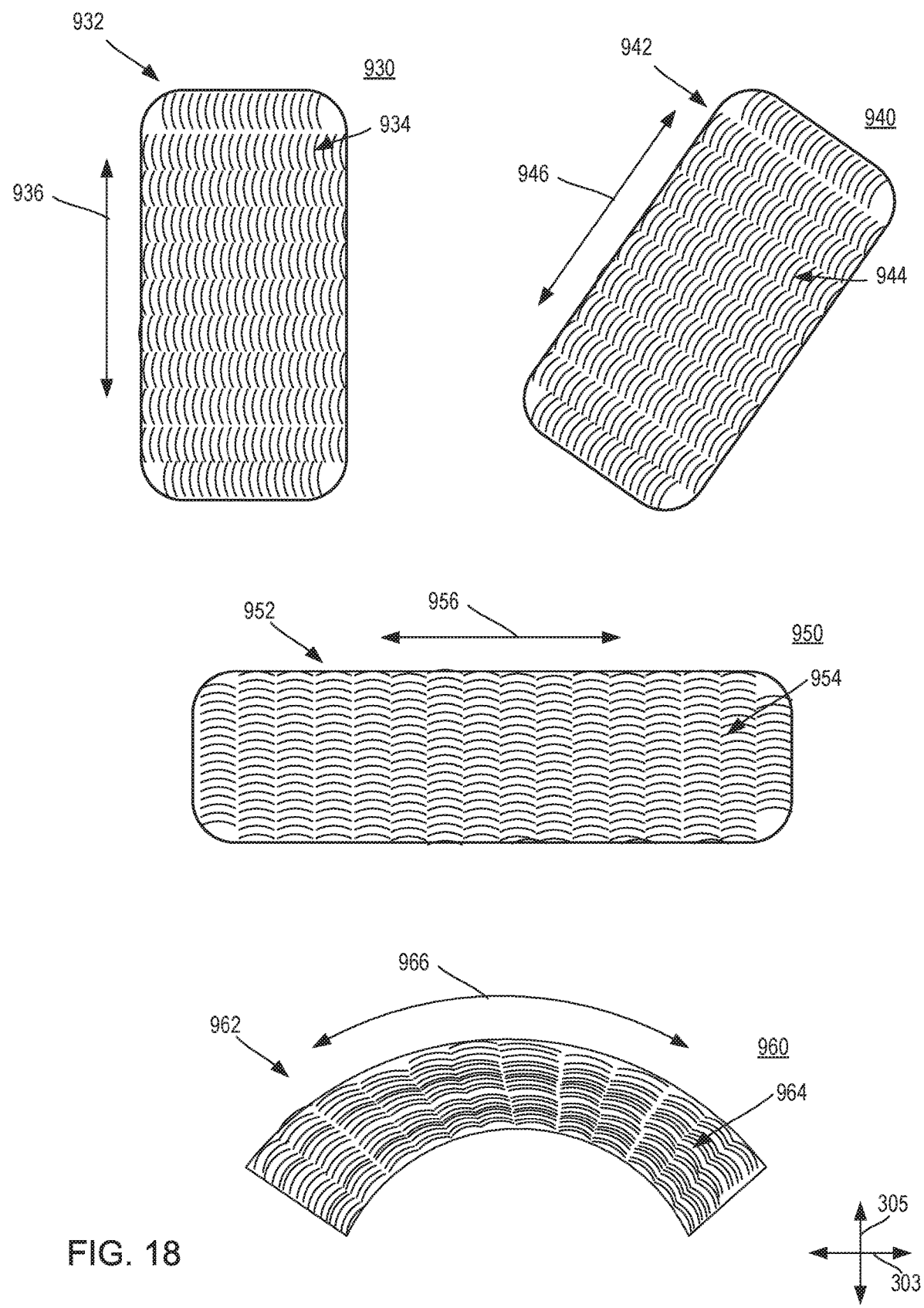
FIG. 18 depicts an example of a front surface of an interactive textile including conductive threads that are conformal to an embroidered thread pattern in accordance with example embodiments of the present disclosure.

FIG. 18 depicts a front view of an interactive textile 930 illustrating a capacitive touch sensor formed with an embroidered thread pattern that provides visual and/or haptic textural indications of a touch input direction. Interactive textile 930 comprises an embroidered thread pattern 934 that defines an ornamental feature 932 on a first surface of a flexible substrate. In this example, embroidered thread pattern 934 includes directional stitches that provide a visual or haptic indication of a touch input or gesture direction. In this example, the directional stitches indicate that a swipe gesture can be performed as shown at 936. More particularly, it can be seen that the individual stitches are elongated in the longitudinal direction 305. The elongated direction of the directional stitches provides an indication to provide a swipe gesture in the direction as shown at 936.

In some examples, the directional stitches of the embroidered thread pattern can be formed from embroidery thread applied as part of an embroidery process. In other examples, the directional stitches can be formed from non-conductive threads 230 used to attach one or more conductive fibers to a flexible substrate.

A set of conductive threads can be attached to a back surface (not shown) of the interactive textile 930 to form a capacitive touch sensor. The set of conductive threads can be elongated in the lateral direction with a spacing in the longitudinal direction between threads. Such a configuration can be configured to receive a swipe gesture in the longitudinal direction as shown at 936.

Interactive textile 940 comprises an embroidered thread pattern 944 that defines an ornamental feature 942 on a first surface of a flexible substrate. In this example, embroidered thread pattern 944 includes directional stitches that provide a visual or haptic indication of a touch input or gesture direction. In this example, the directional stitches indicate that a swipe gesture can be performed in a diagonal direction as shown at 946. More particularly, it can be seen that the individual stitches are elongated in the diagonal direction. The diagonal direction of the directional stitches provides an indication to provide a swipe gesture in the direction as shown at 946. A set of conductive threads elongated in a direction orthogonal to the direction as shown at 946 can be attached to a back surface (not shown) of the interactive textile 940 to form a capacitive touch sensor. The set of conductive threads can be elongated in the orthogonal direction with a spacing in the direction shown at 946 between threads. Such a configuration can be configured to receive a swipe gesture in the direction as shown at 946.

Interactive textile 950 comprises an embroidered thread pattern 954 that defines an ornamental feature 952 on a first surface of a flexible substrate. In this example, embroidered thread pattern 954 includes directional stitches that provide a visual or haptic indication of a touch input or gesture direction. In this example, the directional stitches indicate that a swipe gesture can be performed in a lateral direction as shown at 956. More particularly, it can be seen that the individual stitches are elongated in the lateral direction 303. The lateral direction of the directional stitches provides an indication to provide a swipe gesture in the direction as shown at 956. A set of conductive threads elongated in the longitudinal direction orthogonal to the direction as shown at 956 can be attached to a back surface (not shown) of the interactive textile 950 to form a capacitive touch sensor. The set of conductive threads can be elongated in the orthogonal direction with a spacing in the direction shown at 956 between threads. Such a configuration can be configured to receive a swipe gesture in the direction as shown at 956.

Interactive textile 960 comprises an embroidered thread pattern 964 that defines an ornamental feature 962 on a first surface of a flexible substrate. In this example, embroidered thread pattern 964 includes directional stitches that provide a visual or haptic indication of a touch input or gesture direction. In this example, the directional stitches indicate that a swipe gesture can be performed in a curved or rainbow-like direction as shown at 966. More particularly, it can be seen that the individual stitches are elongated in a direction indicating the curve. The direction of the directional stitches provides an indication to provide a swipe gesture in the direction as shown at 966. A set of conductive threads elongated in a direction orthogonal to the direction as shown at 966 can be attached to a back surface (not shown) of the interactive textile 960 to form a capacitive touch sensor. The set of conductive threads can be elongated in the orthogonal direction with a spacing in the direction shown at 966 between threads. Such a configuration can be configured to receive a swipe gesture in the direction as shown at 966.

Figure 19:
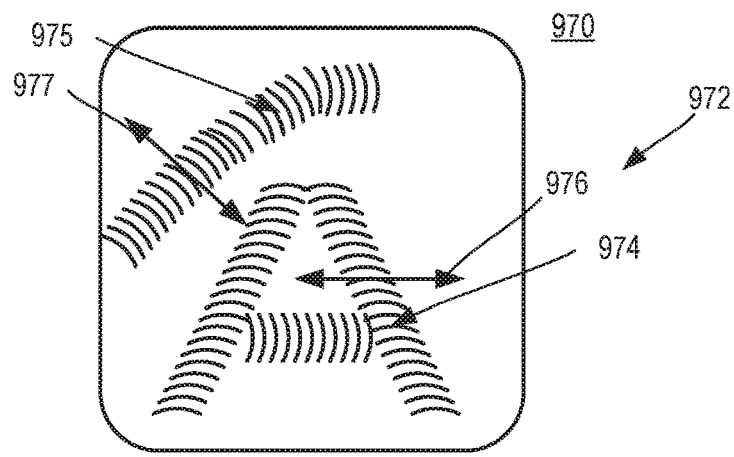
FIG. 19 depicts an example of a front surface of an interactive textile including conductive threads that are conformal to an embroidered thread pattern in accordance with example embodiments of the present disclosure.
Figure 19:
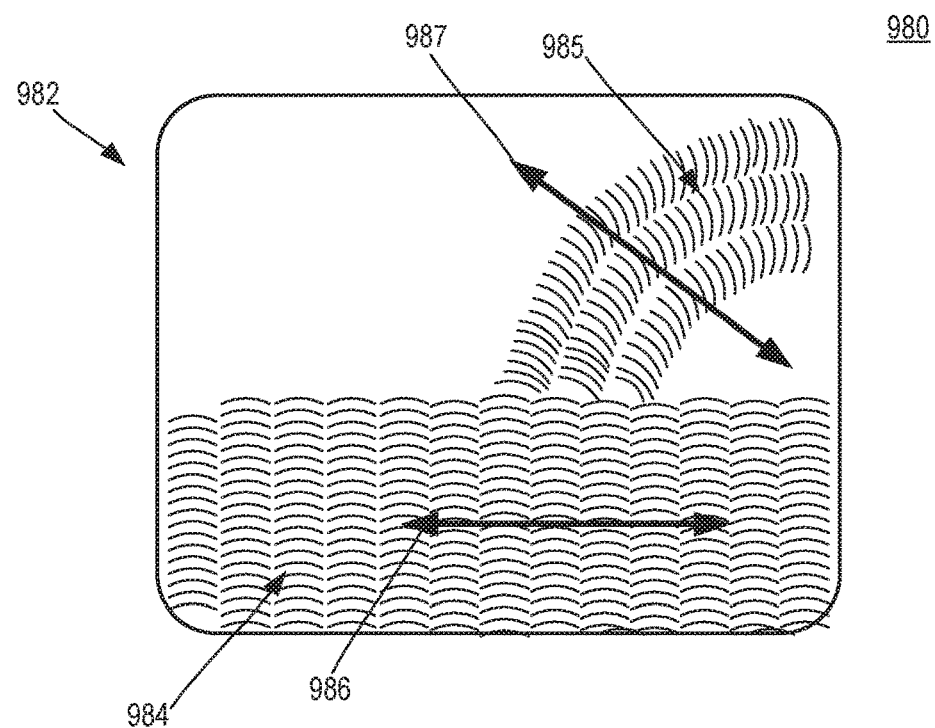
Figure 19:
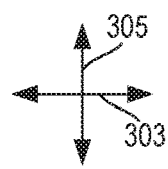

Although the examples depicted in FIG. 19 show one-dimensional capacitive touch sensors, two-dimensional capacitive touch sensors may similarly be formed. Moreover, example embodiments may include additional geometries such as circles, spirals, etc.

FIG. 19 depicts a front view of an interactive textile 970 illustrating a capacitive touch sensor formed with an embroidered thread pattern that provides visual and/or haptic indications of a touch input direction. Interactive textile 970 comprises an embroidered thread pattern including a first portion 974 and a second portion 975 that define an ornamental feature 972 on a first surface of a flexible substrate. In this example, the first portion 974 of the embroidered thread pattern includes directional stitches that provide a visual indication of a touch input or gesture direction. In this example, the directional stitches indicate that a swipe gesture can be performed in the lateral direction as shown at 976. More particularly, it can be seen that the individual stitches are elongated in the lateral direction 303. The elongated direction of the directional stitches provides an indication to provide a swipe gesture in the direction as shown at 976. The second portion 975 of the embroidered thread pattern includes directional stitches that provide a visual indication of a touch input or gesture direction. In this example, the directional stitches indicate that a swipe gesture can be performed in the diagonal direction as shown at 977. More particularly, it can be seen that the individual stitches are elongated in the diagonal direction. The elongated direction of the directional stitches provides an indication to provide a swipe gesture in the direction as shown at 977. A first set of conductive threads elongated in a direction orthogonal to the direction as shown at 976 can be attached to a back surface (not shown) of the interactive textile 970 to form a first portion of a capacitive touch sensor. The set of conductive threads can be elongated in the orthogonal direction with a spacing in the direction shown at 976 between threads. Such a configuration can be configured to receive a swipe gesture in the direction as shown at 976. A second set of conductive threads elongated in a direction orthogonal to the direction as shown at 977 can be attached to a back surface (not shown) of the interactive textile 970 to form a capacitive touch sensor. The second set of conductive threads can be elongated in the orthogonal direction with a spacing in the direction shown at 977 between threads. Such a configuration can be configured to receive a swipe gesture in the direction as shown at 977.

FIG. 19 also depicts an interactive textile 980 that comprises an embroidered thread pattern including a first portion 984 and a second portion 984 that define an ornamental feature 982 on a first surface of a flexible substrate. In this example, the first portion 984 of the embroidered thread pattern includes directional stitches that provide a visual indication of a touch input or gesture direction. In this example, the directional stitches indicate that a swipe gesture can be performed in the lateral direction as shown at 986. More particularly, it can be seen that the individual stitches are elongated in the lateral direction 303. The elongated direction of the directional stitches provides an indication to provide a swipe gesture in the direction as shown at 986. The second portion 985 of the embroidered thread pattern includes directional stitches that provide a visual indication of a touch input or gesture direction. In this example, the directional stitches indicate that a swipe gesture can be performed in the diagonal direction as shown at 987. More particularly, it can be seen that the individual stitches are elongated in the diagonal direction. The elongated direction of the directional stitches provides an indication to provide a swipe gesture in the direction as shown at 987. A first set of conductive threads elongated in a direction orthogonal to the direction as shown at 986 can be attached to a back surface (not shown) of the interactive textile 980 to form a first portion of a capacitive touch sensor. The set of conductive threads can be elongated in the orthogonal direction with a spacing in the direction shown at 986 between threads. Such a configuration can be configured to receive a swipe gesture in the direction as shown at 986. A second set of conductive threads elongated in a direction orthogonal to the direction as shown at 987 can be attached to a back surface (not shown) of the interactive textile 970 to form a capacitive touch sensor. The second set of conductive threads can be elongated in the orthogonal direction with a spacing in the direction shown at 987 between threads. Such a configuration can be configured to receive a swipe gesture in the direction as shown at 987.

As interactive textiles 970 and 980 illustrate, a single interactive textile can include multiple embroidered thread patterns or portions of an embroidered thread pattern that provide indications of different input gesture directions.

Figure 20:
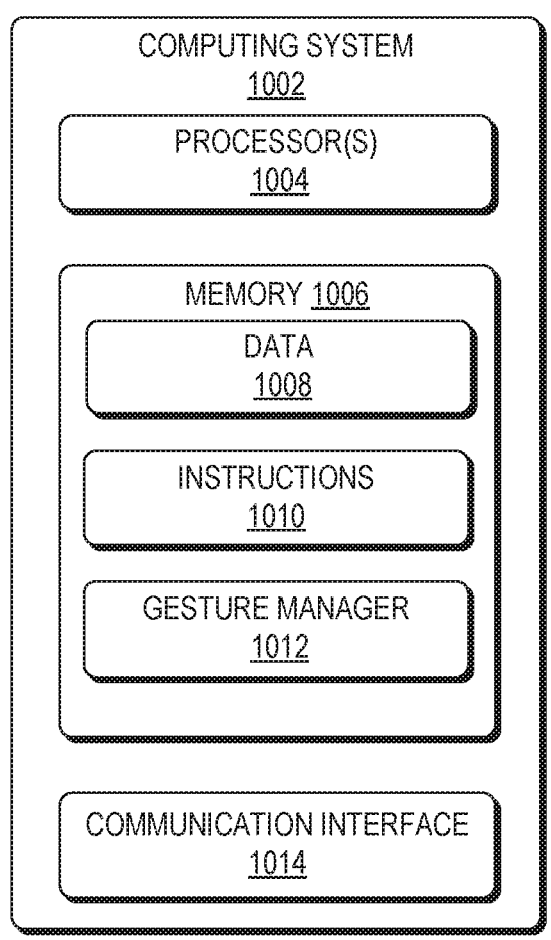
FIG. 20 depicts a block diagram of an example computing system that can be used to implement any type of computing device as described herein.

FIG. 20 illustrates various components of an example computing system 1002 that can implement any type of client, server, and/or computing device described herein. In embodiments, computing system 1002 can be implemented as one or a combination of a wired and/or wireless wearable device, System-on-Chip (SoC), and/or as another type of device or portion thereof. Computing system 1002 may also be associated with a user (e.g., a person) and/or an entity that operates the device such that a device describes logical devices that include users, software, firmware, and/or a combination of devices.

Computing system 1002 includes a communication interface 1014 that enables wired and/or wireless communication of data 1008 (e.g., received data, data that is being received, data scheduled for broadcast, data packets of the data, etc.). Data 1008 can include configuration settings of the device, media content stored on the device, and/or information associated with a user of the device. Media content stored on computing system 1002 can include any type of audio, video, and/or image data. Computing system 1002 includes one or more data inputs via which any type of data, media content, and/or inputs can be received, such as human utterances, touch data generated by interactive textile 102, user-selectable inputs (explicit or implicit), messages, music, television media content, recorded video content, and any other type of audio, video, and/or image data received from any content and/or data source.

Communication interfaces can be implemented as any one or more of a serial and/or parallel interface, a wireless interface, any type of network interface, a modem, and as any other type of communication interface. Communication interfaces provide a connection and/or communication links between computing system 1002 and a communication network by which other electronic, computing, and communication devices communicate data with computing system 1002.

Computing system 1002 includes one or more processors 1004 (e.g., any of microprocessors, controllers, and the like), which process various computer-executable instructions to control the operation of computing system 1002 and to enable techniques for, or in which can be embodied, interactive textiles. Alternatively or in addition, computing system 1002 can be implemented with any one or combination of hardware, firmware, or fixed logic circuitry that is implemented in connection with processing and control circuits. Although not shown, computing system 1002 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 1002 also includes memory 1006 which may include computer-readable media, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Memory 1006 may also include a mass storage media device of computing system 1002.

Computer-readable media provides data storage mechanisms to store device data, as well as computer-readable instructions 1010 which can implement various device applications and any other types of information and/or data related to operational aspects of computing system 1002. For example, an operating system can be maintained as a computer application with computer-readable media and executed on processors 1004. Device applications may include a device manager, such as any form of a control application, software application, signal-processing and control module, code that is native to a particular device, a hardware abstraction layer for a particular device, and so on.

Memory 1006 may also include a gesture manager 1012. Gesture manager 1012 is capable of interacting with applications interactive textile 102 effective to activate various functionalities associated with computing device 106 and/or applications through touch-input (e.g., gestures) received by interactive textile 102. Gesture manager 1012 may be implemented at a computing device 106 that is local to object 104, or remote from object 104.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An interactive textile, comprising:
a flexible substrate;
an embroidered thread pattern defining an ornamental feature on a first surface of the flexible substrate, the embroidered thread pattern defining at least one curved edge of the ornamental feature relative to the first surface of the flexible substrate; and
a touch input sensor comprising a set of conductive threads coupled to an opposite second surface of the flexible substrate at a corresponding area of at least a portion of the embroidered thread pattern, the set of conductive threads forming a conductive thread pattern on the opposite second surface that is conformal to the ornamental feature on the first surface at the portion of the embroidered thread pattern, the set of conductive threads being conformal to the at least one curved edge of the ornamental feature, and the embroidered thread pattern including one or more embroidery threads that extend through the flexible substrate from the opposite second surface to the first surface.

2. The interactive textile of claim 1, wherein:
the embroidered thread pattern includes one or more first embroidery threads; and
the set of conductive threads are embroidered to the flexible substrate with one or more second embroidery threads.

3. The interactive textile of claim 2, wherein:
the set of conductive threads is coupled over at least a portion of the one or more first embroidery threads extending from the opposite second surface of the flexible substrate.

4. The interactive textile of claim 2, wherein:
the set of conductive threads is coupled between the opposite second surface of the flexible substrate and at least a portion of the one or more first embroidery threads extending from the opposite second surface of the flexible substrate.

5. The interactive textile of claim 1, wherein:
the set of conductive threads includes a first conductive thread and a second conductive thread;
the first conductive thread is separated from the second conductive thread by a spacing in a first direction that intersects the first conductive thread and the second conductive thread; and
the spacing between the first conductive thread and the second conductive thread decreases along a length of the first conductive thread and a length of second conductive thread.

6. The interactive textile of claim 5, wherein:
the touch input sensor has a variable touch sensitivity that is dependent on the spacing between the first conductive thread and the second conductive thread.

7. The interactive textile of claim 1, wherein:
the set of conductive threads is a first set of conductive threads and the conductive thread pattern is a first conductive thread pattern;
the portion of the embroidered thread pattern is a first portion defining a first shape of the ornamental feature;
the embroidered thread pattern includes a second portion defining a second shape of the ornamental feature;
the interactive textile includes a second set of conductive threads coupled to the flexible substrate at an area of at least the second portion of the embroidered thread pattern; and
the second set of conductive threads forms a second conductive thread pattern that is conformal to the ornamental feature at the second portion of the embroidered thread pattern.

8. The interactive textile of claim 7, further comprising:
sensing circuitry coupled to the first set of conductive threads and the second set of conductive threads;
wherein the sensing circuitry is configured to detect a first gesture provided at the first portion of the embroidered thread pattern and to detect a second gesture provided at the second portion of the embroidered thread pattern.

9. The interactive textile of claim 8, wherein:
the first conductive thread pattern is configured such that the second gesture provided at the first portion of the embroidered thread pattern is insufficient to trigger a detection by the sensing circuitry; and
the second conductive thread pattern is configured such that the first gesture provided at the second portion of the embroidered thread pattern is insufficient to trigger a detection by the sensing circuitry.

10. The interactive textile of claim 8, wherein:
the second conductive thread pattern and the first conductive thread pattern are different.

11. The interactive textile of claim 1, wherein the set of conductive threads is a first set of conductive threads, the interactive textile further comprising:
a second set of conductive threads coupled to the flexible substrate at the area of the portion of the embroidered thread pattern, each of the second set of conductive threads crossing the first set of conductive threads to form a grid of conductive threads.

12. The interactive textile of claim 1, wherein:
at least one of the conductive threads extends through the flexible substrate and is visible on the embroidered thread pattern.

13. The interactive textile of claim 1, further comprising:
at least one of a garment, a garment accessory, or a garment container including the flexible substrate.

14. An interactive object, comprising:
an interactive textile comprising an embroidered thread pattern on a first surface of a flexible substrate and a set of conductive fibers coupled to an opposite second surface of the flexible substrate at an area of at least a portion of the embroidered thread pattern, the embroidered thread pattern defining at least one curved edge relative to the first surface of the flexible substrate, the set of conductive fibers comprising a conductive thread pattern that is conformal to the at least one curved edge defined by the embroidered thread pattern, the embroidered thread pattern including one or more embroidery threads that extend through the flexible substrate from the opposite second surface to the first surface; and
an electronics component coupled to the flexible substrate, the electronics component in communication with the set of conductive fibers.

15. The interactive object of claim 14, further comprising:
a capacitive touch sensor comprising the set of conductive fibers;
wherein the electronics component includes sensing circuitry configured to detect a touch input to the set of conductive threads.

16. The interactive object of claim 15, wherein:
the sensing circuitry includes a textile controller;
the electronics component includes an internal electronics module including the textile controller; and
the interactive object further comprises a removable electronics module removably coupled to the internal electronics module, the removable electronics modules including a processor and a power source.

17. A method of forming an interactive object, comprising:
forming an embroidered thread pattern on a flexible substrate, the embroidered thread pattern defining an ornamental feature on a first surface of the flexible substrate, the embroidered thread pattern defining at least one curved edge of the ornamental feature relative to the first surface of the flexible substrate; and
forming a touch input sensor comprising a set of conductive threads coupled to an opposite second surface of the flexible substrate at a corresponding area of at least a portion of the embroidered thread pattern, the set of conductive threads forming a conductive thread pattern on the opposite second surface that is conformal to the ornamental feature on the first surface at the portion of the embroidered thread pattern, the embroidered thread pattern including one or more embroidery threads that extend through the flexible substrate from the opposite second surface to the first surface.

18. The method of claim 17, wherein:
forming the embroidered thread pattern comprises performing an embroidering process; and
forming the set of conductive threads comprises performing the embroidering process to form the embroidered thread pattern.

19. The method of claim 17, wherein:
forming the embroidered thread pattern comprises performing a first embroidering process; and
forming the set of conductive threads comprises performing a second embroidering process after performing the first embroidering process.

20. The method of claim 17, wherein:
forming the set of conductive threads comprises performing a first embroidering process;
forming the embroidered thread pattern comprises performing a second embroidering process after performing the first embroidering process; and
the set of conductive threads is coupled to the flexible substrate by one or more threads of the embroidered thread pattern.

\* \* \* \* \*